(12) United States Patent
Kojima

(10) Patent No.: US 9,189,389 B2
(45) Date of Patent: Nov. 17, 2015

(54) MEMORY CONTROLLER AND MEMORY SYSTEM

(71) Applicant: Kabushiki Kaisha Toshiba, Minato-ku (JP)

(72) Inventor: Yoshihisa Kojima, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 93 days.

(21) Appl. No.: 14/023,788

(22) Filed: Sep. 11, 2013

(65) Prior Publication Data

US 2014/0258596 A1 Sep. 11, 2014

Related U.S. Application Data

(60) Provisional application No. 61/776,377, filed on Mar. 11, 2013.

(51) Int. Cl.
*G06F 13/38* (2006.01)
*G06F 13/12* (2006.01)
*G06F 3/00* (2006.01)
*G06F 12/02* (2006.01)

(52) U.S. Cl.
CPC .... *G06F 12/0246* (2013.01); *G06F 2212/7205* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 7,315,916 | B2 * | 1/2008 | Bennett et al. | 711/103 |
| 8,964,466 | B2 * | 2/2015 | Shalvi et al. | 365/185.03 |
| 2009/0248964 | A1 | 10/2009 | Yano et al. | |
| 2011/0029723 | A1 * | 2/2011 | Lee et al. | 711/103 |
| 2011/0145475 | A1 * | 6/2011 | Eleftheriou et al. | 711/103 |
| 2012/0008394 | A1 * | 1/2012 | Lee et al. | 365/185.11 |
| 2012/0072644 | A1 * | 3/2012 | Asano et al. | 711/103 |
| 2013/0103889 | A1 * | 4/2013 | Jeong | 711/103 |
| 2013/0132641 | A1 * | 5/2013 | Suzuki | 711/103 |
| 2013/0145085 | A1 * | 6/2013 | Yu et al. | 711/103 |
| 2013/0159609 | A1 * | 6/2013 | Haas et al. | 711/103 |
| 2014/0089568 | A1 * | 3/2014 | Chung et al. | 711/103 |
| 2014/0237322 | A1 * | 8/2014 | Shalvi et al. | 714/773 |

FOREIGN PATENT DOCUMENTS

| | | |
|---|---|---|
| JP | 4675985 B2 | 2/2011 |
| JP | 4787266 B2 | 7/2011 |
| JP | 4933269 B2 | 2/2012 |
| WO | WO 2005/066972 A1 | 7/2005 |

* cited by examiner

*Primary Examiner* — Michael Sun
(74) *Attorney, Agent, or Firm* — Oblon, McClelland, Maier & Neustadt, L.L.P.

(57) ABSTRACT

A memory controller having a plurality of channels according to an embodiment of the present invention includes: a valid page information management unit that manages, for each of the channel, identification information of a valid page; a write buffer that stores data to be written to the memory; a garbage collection control unit that executes a garbage collection process; and a channel controller capable of executing multi-plane read. The garbage collection control unit controls multi-plane read of the channel controller based on the identification information to level a total number of valid pages read from each of the channel.

20 Claims, 28 Drawing Sheets

BITMAP INDICATING VALIDITY (VALID: 1, INVALID: 0) OF PHYSICAL PAGE

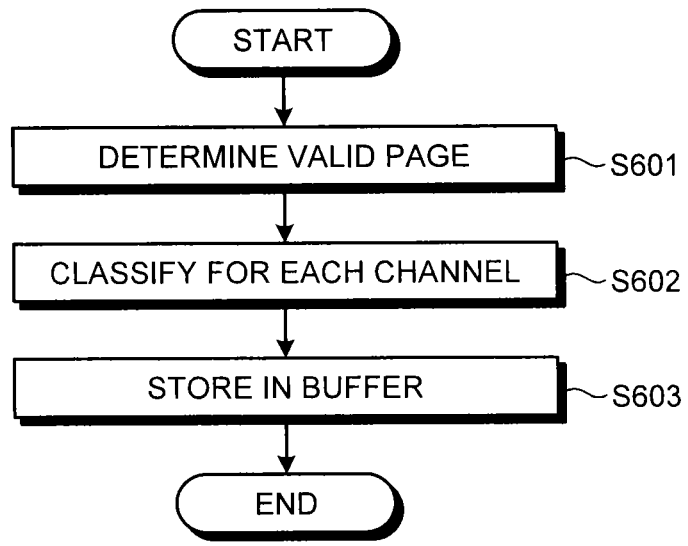
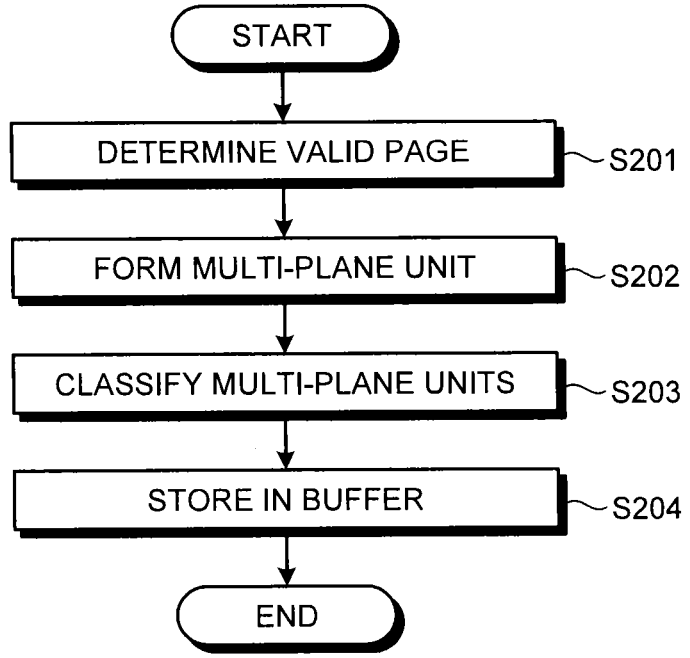

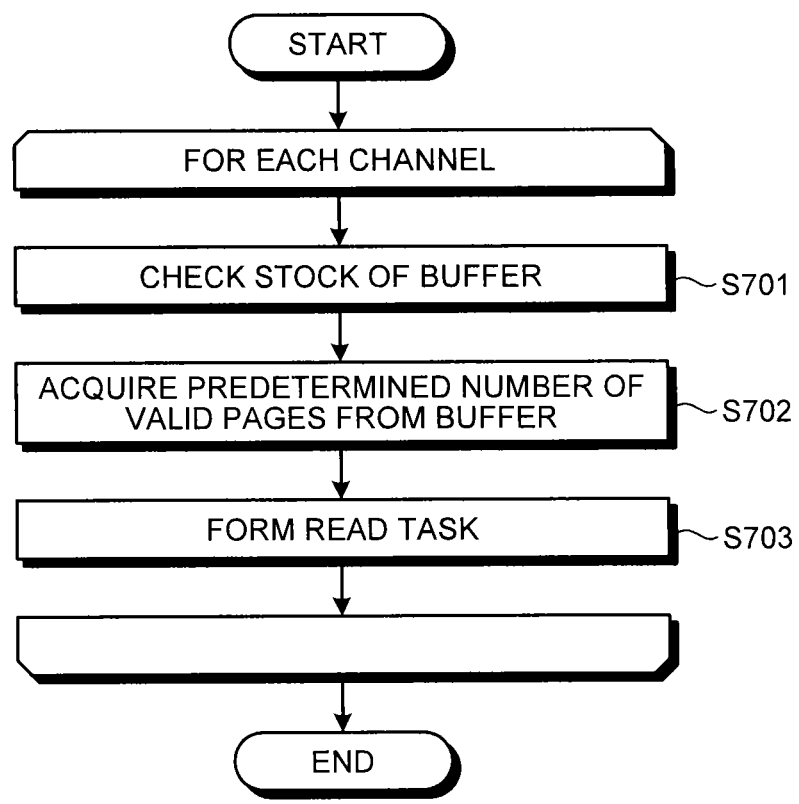

FIG.28

LOGICAL PAGE 0

| ch 0 | 1 | 5 | 9 | 13 | 17 | 21 | 25 | 29 |
|---|---|---|---|---|---|---|---|---|
| ch 1 | 2 | 6 | 10 | 14 | 18 | 22 | 26 | 30 |
| ch 2 | 3 | 7 | 11 | 15 | 19 | 23 | 27 | 31 |
| ch 3 | 4 | 8 | 12 | 16 | 20 | 24 | 28 | 32 |

LOGICAL PAGE 1

| ch 0 | 33 | 37 | 41 | 45 | 49 | 53 | 57 | 61 |
|---|---|---|---|---|---|---|---|---|
| ch 1 | 34 | 38 | 42 | 46 | 50 | 54 | 58 | 62 |
| ch 2 | 35 | 39 | 43 | 47 | 51 | 55 | 59 | 63 |
| ch 3 | 36 | 40 | 44 | 48 | 52 | 56 | 60 | 64 |

MEMORY CONTROLLER AND MEMORY SYSTEM

CROSS-REFERENCE TO RELATED APPLICATIONS

This application is based upon and claims the benefit of priority from Provisional Patent Application No. 61/776,377, filed on Mar. 11, 2013; the entire contents of which are incorporated herein by reference.

FIELD

Embodiments of the present invention relate to a memory controller and a memory system.

BACKGROUND

Garbage collection is a process of moving valid pages only included in blocks containing valid pages including latest data and already-overwritten invalid pages into another block to generate new free blocks.

BRIEF DESCRIPTION OF THE DRAWINGS

FIG. 10 illustrates a flowchart of valid page buffering according to an embodiment;

FIG. 11 illustrates a flowchart of valid page buffering according to a first embodiment;

FIG. 12 illustrates a flowchart of read task generation according to an embodiment;

FIG. 28 is a diagram illustrating a distribution of valid pages according to an embodiment;

DETAILED DESCRIPTION

Figure 1:
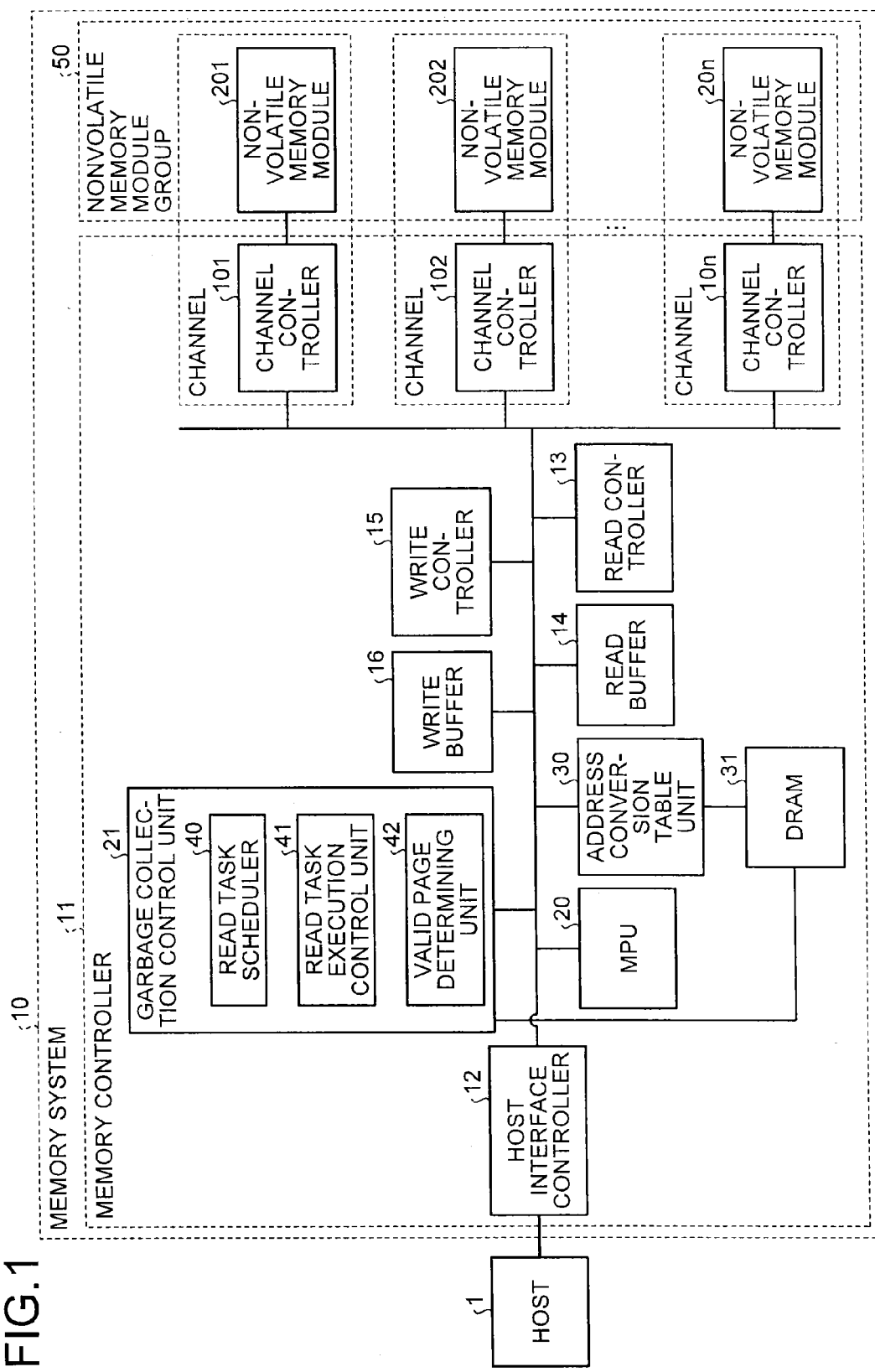
FIG. 1 is a block diagram illustrating a configuration of a memory system according to an embodiment.

A memory controller having a plurality of channels which are connectable to a plurality of nonvolatile memories according to an embodiment of the present invention includes: a valid page information management unit that manages, for each of the channel, identification information of a valid page of the nonvolatile memories, the valid page being a physical page of the nonvolatile memory that stores valid data; a write buffer that stores data to be written to the nonvolatile memory; a garbage collection control unit that executes a garbage collection process, the garbage collection process including transferring the valid data stored in the valid page from the nonvolatile memory into the write buffer and writing the valid data back to the nonvolatile memory; and a channel controller, provided in each of the channel, that is capable of executing multi-plane read to the nonvolatile memory, the multi-plane read including reading data stored in the physical pages included in multiple parallel-operable planes of the nonvolatile memory. The garbage collection control unit controls multi-plane read of the channel controller based on the identification information to level a total number of valid pages read from each of the channel.

Hereinafter, a memory controller and a memory system according to embodiments will be described in detail with reference to the accompanying drawings. The present invention is not limited to these embodiments.

First, terms used in the following embodiments will be defined.

A nonvolatile memory module is a module of nonvolatile memories capable of executing a read function and a write function independently. One nonvolatile memory module is single chip memory which is composed of nonvolatile memory control unit and nonvolatile memory cell array. For example, the nonvolatile memory module corresponds to a NAND flash memory chip that provide read, program, erase functions.

A nonvolatile memory cell array is a group of nonvolatile memory cells. A plurality of cells forms a physical page, a plurality of physical pages forms a multi-plane, and a plurality of multi-planes forms a physical block. For example, the nonvolatile memory cell array is a group of NAND flash memory cells.

A nonvolatile memory control unit is a part of a nonvolatile memory module and is a control circuit that receives a read request and a write request for a nonvolatile memory module to operate the nonvolatile memory cell array and page caches.

A page cache is a volatile memory for temporarily storing read data acquired from a nonvolatile memory cell array and data to be written to the nonvolatile memory cell array. The page cache needs to have a size equal to or larger than the size of a multi-plane described later.

A channel is the unit of nonvolatile memory modules that can independently operate within a memory system. A plurality of channels can operate in parallel. One channel is composed of one channel controller and one nonvolatile memory module.

A memory system is composed of a natural number of channels.

A nonvolatile memory module group is a group of a plurality of channels of nonvolatile memory modules that constitutes a memory system.

A sector (sector data) is the smallest unit (for example, 521 B (Bytes)) when a host executes reading or writing with respect to a memory system.

A logical block address (LBA) is an address for designating an address in a memory system when a host issues a read command or a write command. The LBA is also called a logical address.

A physical page is the smallest unit (for example, 4 KB) when one channel of nonvolatile memory modules performs a program operation or a read operation with respect to a nonvolatile memory cell array. A physical page is generally an integer multiple of sectors.

A multi-plane is the largest unit when one channel of nonvolatile memory modules performs a read operation or a write (program) operation at a time. A multi-plane is a group of physical pages having the same multi-plane number belonging to different planes in one channel of nonvolatile memory modules. The multi-plane is an integer multiple of physical pages. For example, four physical pages form one multi-plane. The nonvolatile memory control unit can select one or more physical pages included in one multi-plane in a nonvolatile memory cell array during one read operation or one write (program) operation.

A single-plane read is a read process with respect to a single physical page. The nonvolatile memory control unit performs a read operation from a single physical page of the nonvolatile memory cell array to a page cache.

A multi-plane read is a read process with respect to multi-planes. The nonvolatile memory control unit performs a read operation from multi-planes (a plurality of physical pages) of the nonvolatile memory cell array to a page cache. Since the read process is performed in a plurality of physical pages in the multi-plane in parallel, the time required for data to be written to a page cache is substantially the same as the single-plane read. However, the transfer time from a page cache to a channel controller, a read buffer, a write buffer, or the like is proportional to the amount of data.

A physical block is the smallest unit (for example, 32 physical pages) for erasing a nonvolatile memory cell array at a time in one channel of nonvolatile memory modules. The physical block is an integer multiple of multi-planes.

A logical page is a group of multi-planes having the same multi-plane number (page number) between channels in a nonvolatile memory module group. In this memory system, the logical page is the largest unit for a read operation or a write (program) operation in a channel-parallel manner at a time. The logical page includes user data written from a host and logs associated with the user data. A program operation of the present embodiment is performed using this unit. The logical page is a multiple of the number of channels in a multi-plane.

A logical block is a group of physical blocks having the same block number in a nonvolatile memory module group. An erase operation of the present embodiment is performed using this unit. The logical block is an integer multiple of logical pages. Although the erasure unit of each channel is a physical block, the erasure unit during a parallel operation of a memory system is a logical block.

A channel number is a number for specifying one channel in a memory system.

A block number is a number for specifying one physical block in a nonvolatile memory cell array.

A multi-plane number is a combination number of a combination of the number that specifies a physical block in a certain plane and the number of a physical page specified within the physical block.

An intra-multi-plane offset number is a number for specifying one physical page within one multi-plane.

A physical page number is a number for specifying one physical page within one physical block. The physical page number is expressed by a combination of "multi-plane number" and "intra-multi-plane offset number".

A physical page address is an address for specifying one physical page within a memory system. The physical page address is expressed by a combination of "channel number", "block number", and "physical page number".

An intra-physical page offset number is a number for specifying a sector data location within one physical page.

A physical address is an address for specifying one sector data location within a memory system. The physical address is expressed by a combination of "physical page address" and "intra-physical page offset number".

An address conversion table (look up table: LUT) is a conversion table for pulling the physical address in which the latest sector data of one LBA is recorded. In the present embodiment, an entity (800 MB) of the table is disposed on a DRAM.

A valid page is a physical page that includes at least one sector data (valid data) that is referenced from the address conversion table.

An invalid page is a physical page that does not includes any one item of sector data that is referenced from the address conversion table.

A log is one in which data of which LBA (logical address) is presently written among all physical pages that constitute a logical page is recorded (generally) in a time-series order in which the data is written from a host. The log records the LBA (alternatively, the state where the physical address is not associated with any LBA) of the sectors of a physical address of a physical page. In the present embodiment, the log is disposed in a partial physical page in a logical page. For example, 16 physical pages are included in a logical page, user data is stored in 15 physical pages, and logs associated with these items of data are stored in one physical page.

A channel controller is a controller for controlling a nonvolatile memory module. The channel controller is present in a memory controller.

A memory controller is a control circuit for controlling a memory system. The memory controller constitutes a nonvolatile memory module group and a memory system. The memory controller includes a MPU, a SRAM, a SoC that includes a plurality of controllers, a DRAM, and the like.

A host that issues a sector-based read and write request to a memory system. For example, the host corresponds to a PC, a server, or a RAID controller.

A memory system provides a nonvolatile storage function to a host. The memory system can support a sector-based read and write function. For example, the memory system is a SSD formed of a NAND-flash memory.

A host interface controller provides an IDE or SCSI interface to a host.

A read controller provides a sector-based read function to a host interface controller.

A read buffer is a buffer memory for temporarily storing sector data that a read controller reads from a nonvolatile memory until the data is transferred to a host. For example, the read buffer is formed of a one MB SRAM.

A write buffer is a buffer memory for temporarily storing data written from a host until the data is written to a nonvolatile memory module. Moreover, when the amount of the data written from a host is smaller than the capacity of one physical page, the write buffer also performs a merge process (a so-called read-modify-write process) with data present in the nonvolatile memory. For example, the write buffer is formed of a one MB SRAM and a microcontroller.

A write controller controls writing to a channel controller. When data corresponding to one physical page is provided from a write buffer, a log is generated. Moreover, when data corresponding to one logical page is accumulated in a write buffer, a write request is issued to a channel controller.

An MPU manages logical blocks. The MPU provides a writing destination logical block to a write controller. Moreover, the MPU selects a logical block that is to be a garbage collection target and delivers the logical block to a garbage collection control unit. A logical block in which garbage collection is completed is erased and is supplied as a new writing destination logical block.

A garbage collection control unit performs a garbage collection operation. The garbage collection control unit extracts valid pages from a garbage collection target logical block delivered from the MPU, read the valid pages, and writes data into a garbage collection writing destination block.

A multi-plane unit is a group of a plurality of valid pages included in the same multi-plane. That is, the multi-plane unit is a group of a plurality of valid pages that is readable in parallel according to multi-plane read. The multi-plane unit is composed of a multi-plane number and a bitmap that represents which physical page in the multi-plane is valid.

A valid page buffer (valid page information buffer) is a buffer in which valid page extraction results are buffered to allow the garbage collection control unit to perform the process of extracting valid pages and reading and writing of the valid pages in parallel.

A bucket is a queue (FIFO structure) that classifies the multi-plane unit in each of the channels included in a valid page buffer according to the number of valid pages included in the multi-plane unit. The bucket includes a stock counter that represents how many multi-plane units are included in the bucket.

First Embodiment

FIG. 1 is a block diagram illustrating a configuration of a memory system 10 according to the present embodiment. FIG. 1 illustrates a configuration of the memory system 10 connected to a host 1. The memory system 10 includes a memory controller 11 and a nonvolatile memory module group 50. The memory controller 11 includes a host interface controller 12, a read controller 13, a read buffer 14, a write controller 15, a write buffer 16, channel controllers 101 to 10n, a garbage collection control unit 21, a MPU 20, an address conversion table unit 30, and a DRAM 31. An address conversion table managed by the address conversion table unit 30 and a valid page buffer described later are maintained in the DRAM 31. The read buffer 14 and the write buffer 16 use SRAMs or the like. The nonvolatile memory module group 50 includes nonvolatile memory modules 201 to 20n. The channel controller 101 and the nonvolatile memory module 201 constitute one channel, the channel controller 102 and the nonvolatile memory module 202 constitute one channel, and in this manner, the channel controller 10n and the nonvolatile memory module 20n constitute one channel. Thus, the memory system 10 includes n channels. In the present embodiment, although a memory system that uses non-overwritable nonvolatile memories (for example, NAND flash memories) is described, the present embodiment can be also applied to garbage collection of overwritable nonvolatile memories.

Figure 2:
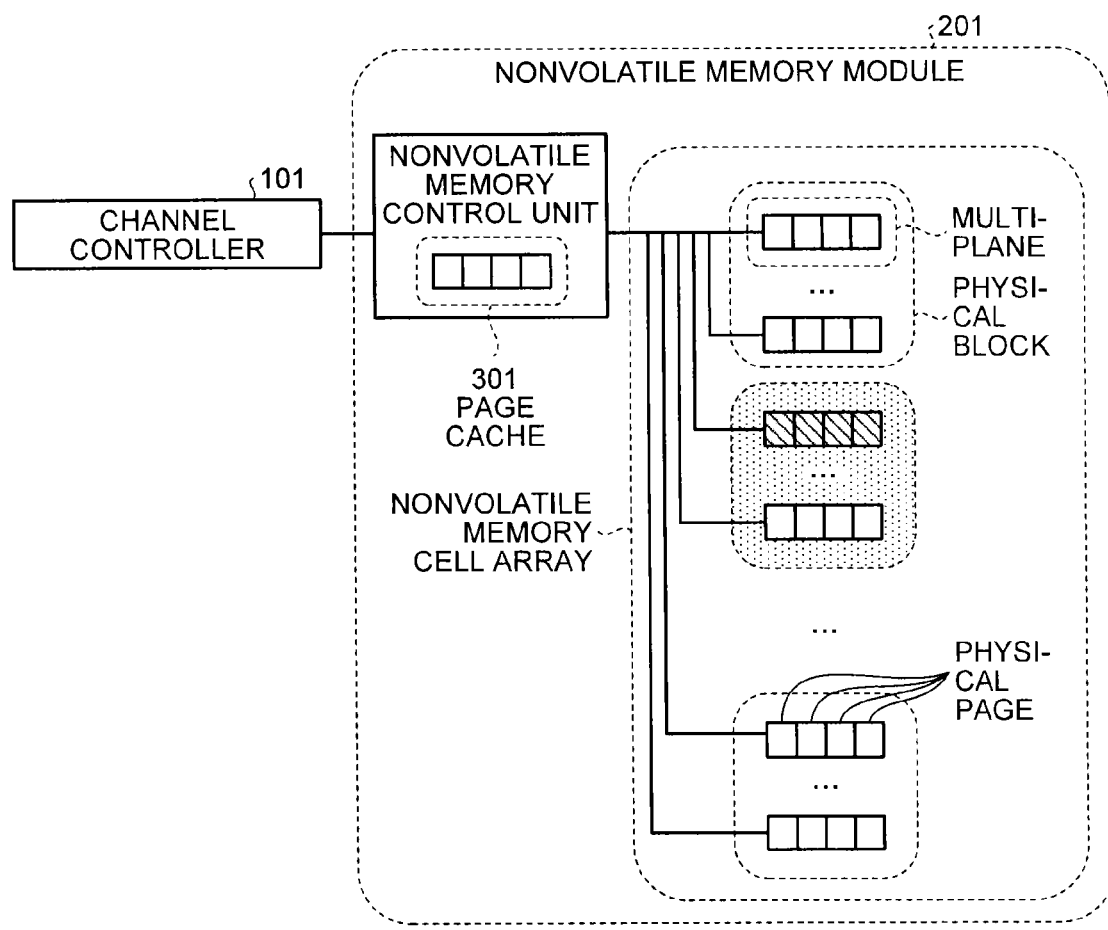
FIG. 2 is a diagram illustrating a configuration of one channel according to an embodiment.
Figure 3:
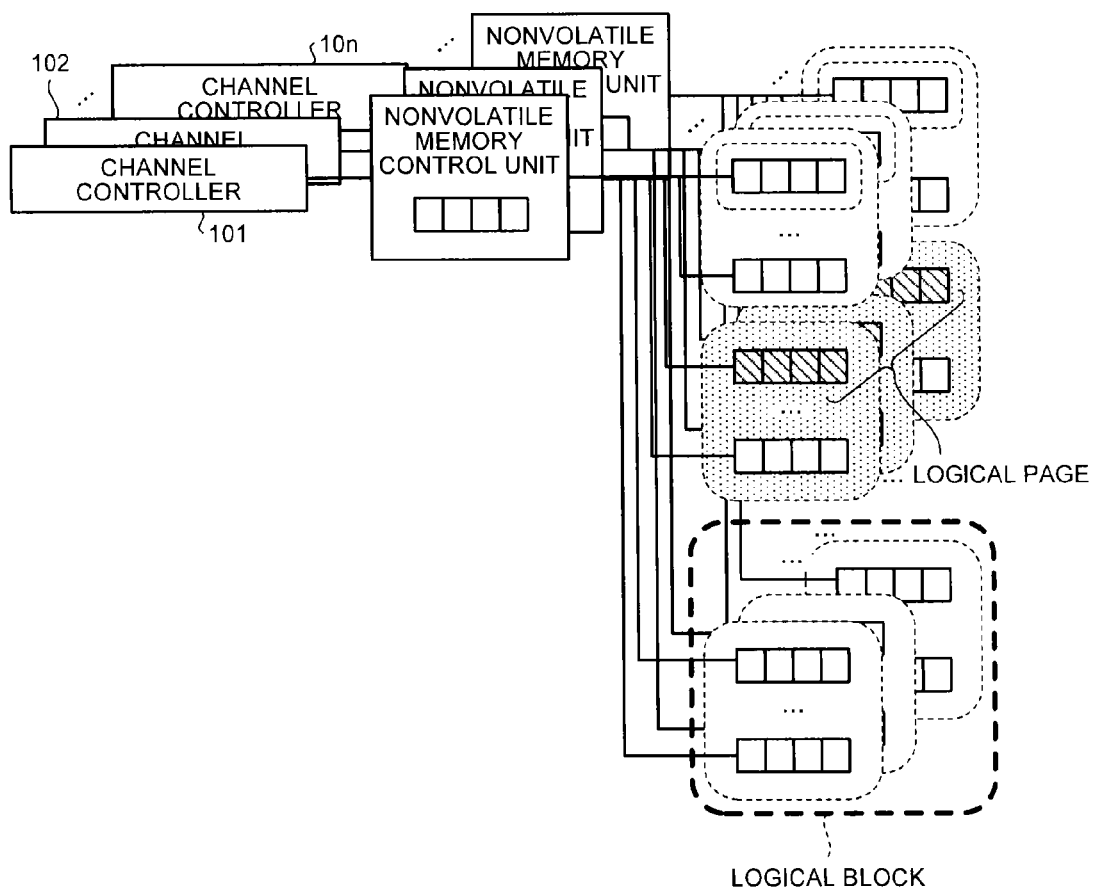
FIG. 3 is a diagram illustrating a configuration of n channels according to an embodiment.
Figure 4:
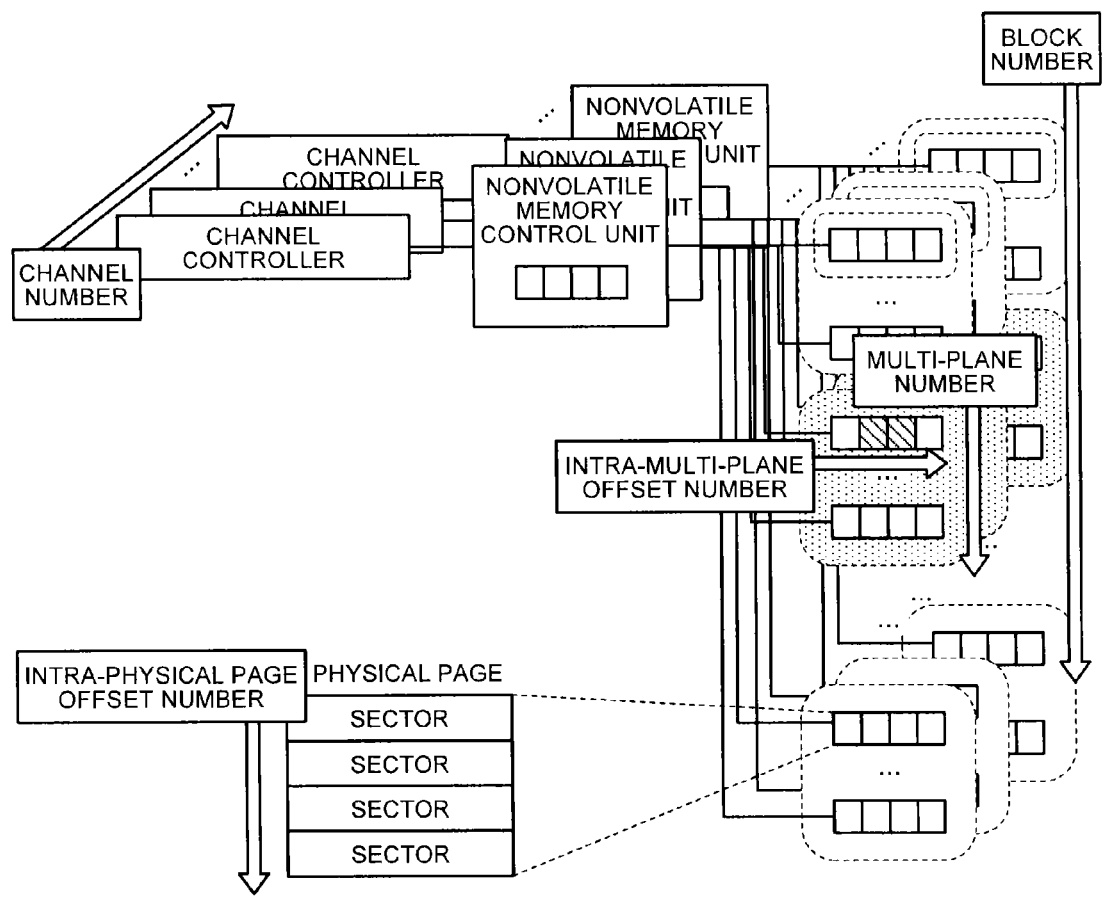
FIG. 4 is a diagram for explaining a method of designating physical addresses at a sector level according to an embodiment.
Figure 5:
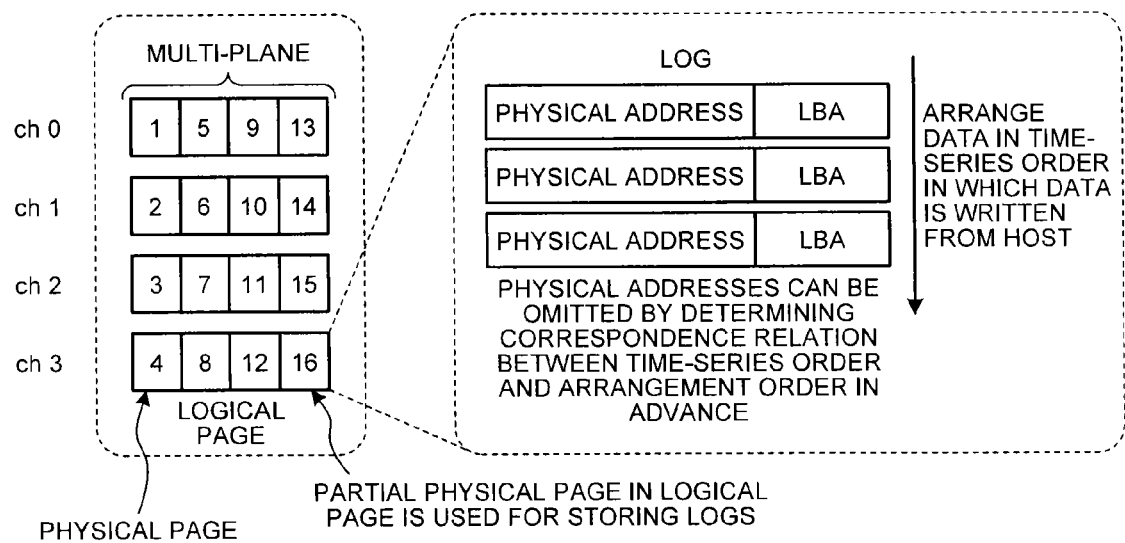
FIG. 5 is a diagram illustrating a read unit for multi-plane read and a configuration of logs according to an embodiment.

FIG. 2 illustrates a configuration of one channel that includes the channel controller 101 and the nonvolatile memory module 201. The nonvolatile memory module 201 includes a page cache 301 which is a volatile memory. FIG. 3 illustrates a configuration of the n channels described above. FIG. 4 is a diagram for explaining a method of designating physical addresses at a sector level. A physical page number in a physical block is uniquely determined by a combination of a multi-plane number and an intra-multi-plane offset number. A physical page address that identifies one physical page in a memory system is determined by a combination of a channel number, a block number, and a physical page number. A physical address that identifies one sector data location in a memory system is determined by a combination of a physical page address and an intra-physical page offset number. FIG. 5 is a diagram illustrating a read unit for multi-plane read and a configuration of logs.

The garbage collection control unit 21 includes a read task scheduler 40 which is a scheduler that obtains such a combination of multi-plane units that can be configured from the stock of valid page buffers described later and that the total number of pages becomes constant. The garbage collection control unit 21 further includes a read task execution control unit 41 that executes a multi-plane read task generated by the read task scheduler 40 and a valid page determining unit 42 that executes a valid page determination for respective physical pages.

Figure 29:
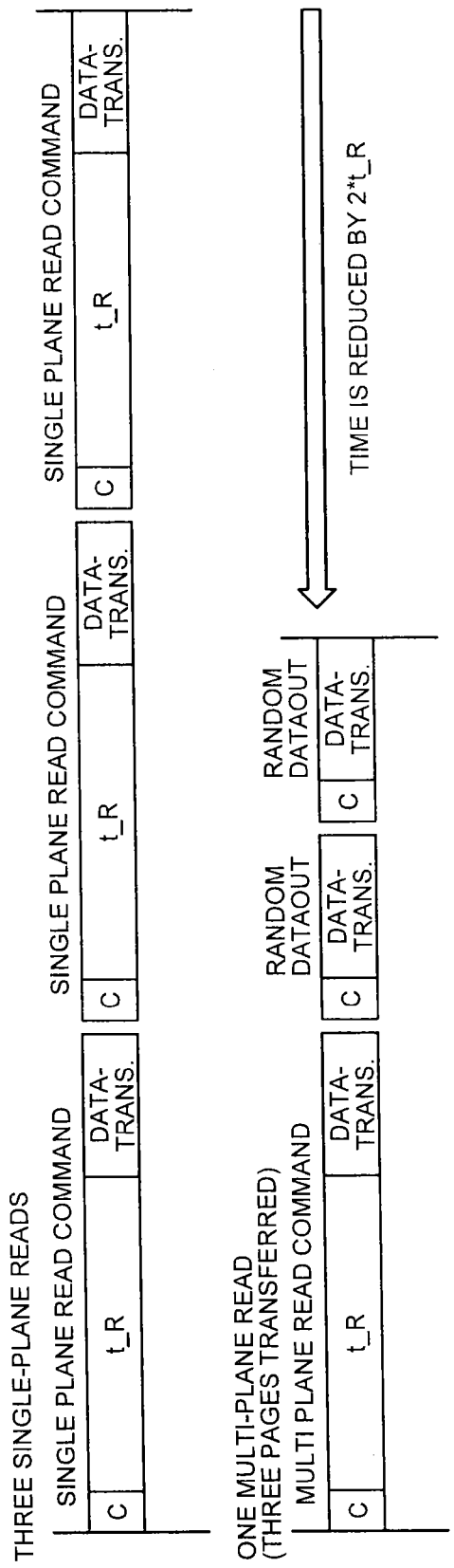
FIG. 29 is a diagram illustrating how much the read time has been reduced by multi-plane read according to an embodiment.
Figure 30:
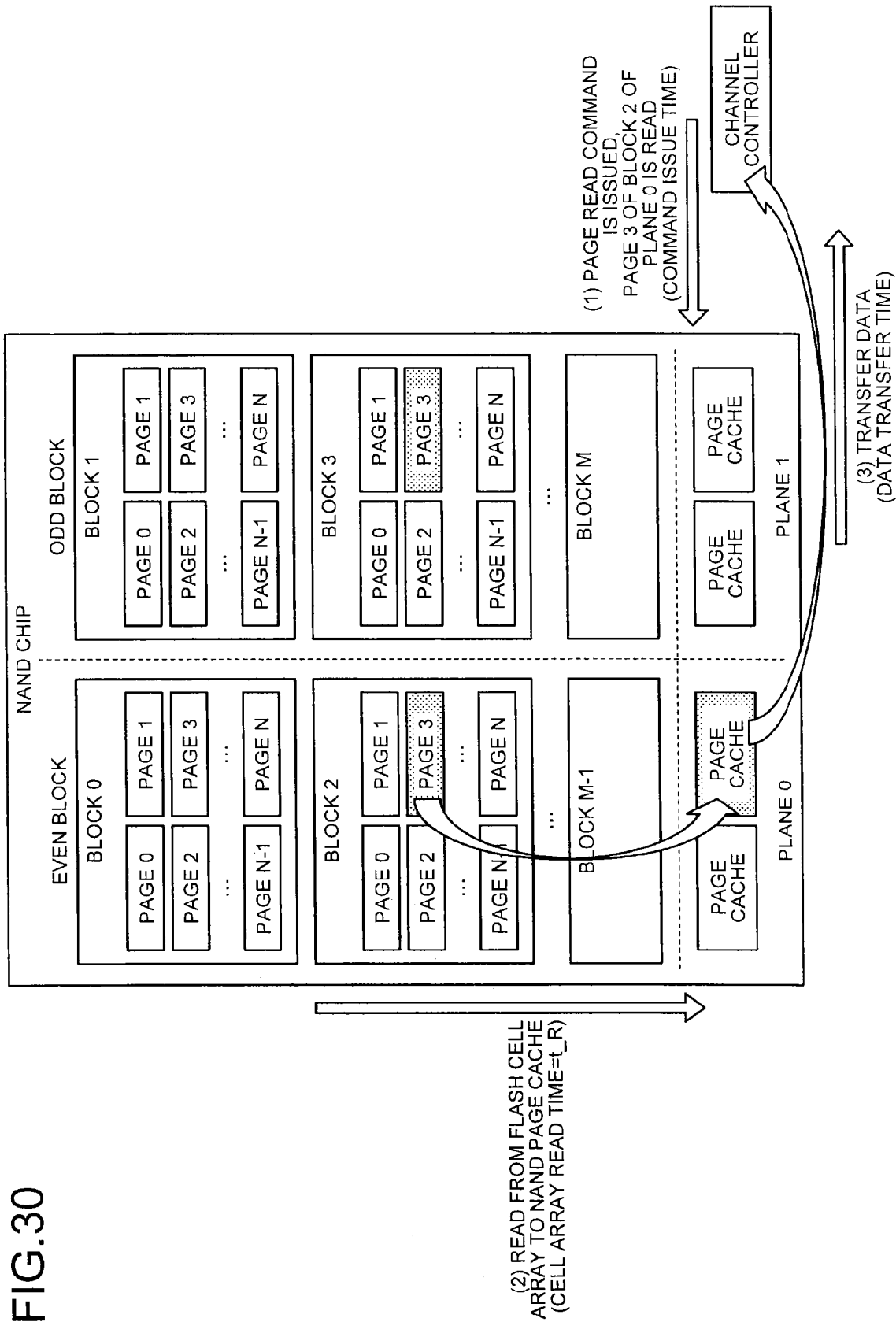
FIG. 30 is a diagram for explaining single-plane read according to an embodiment.
Figure 31:
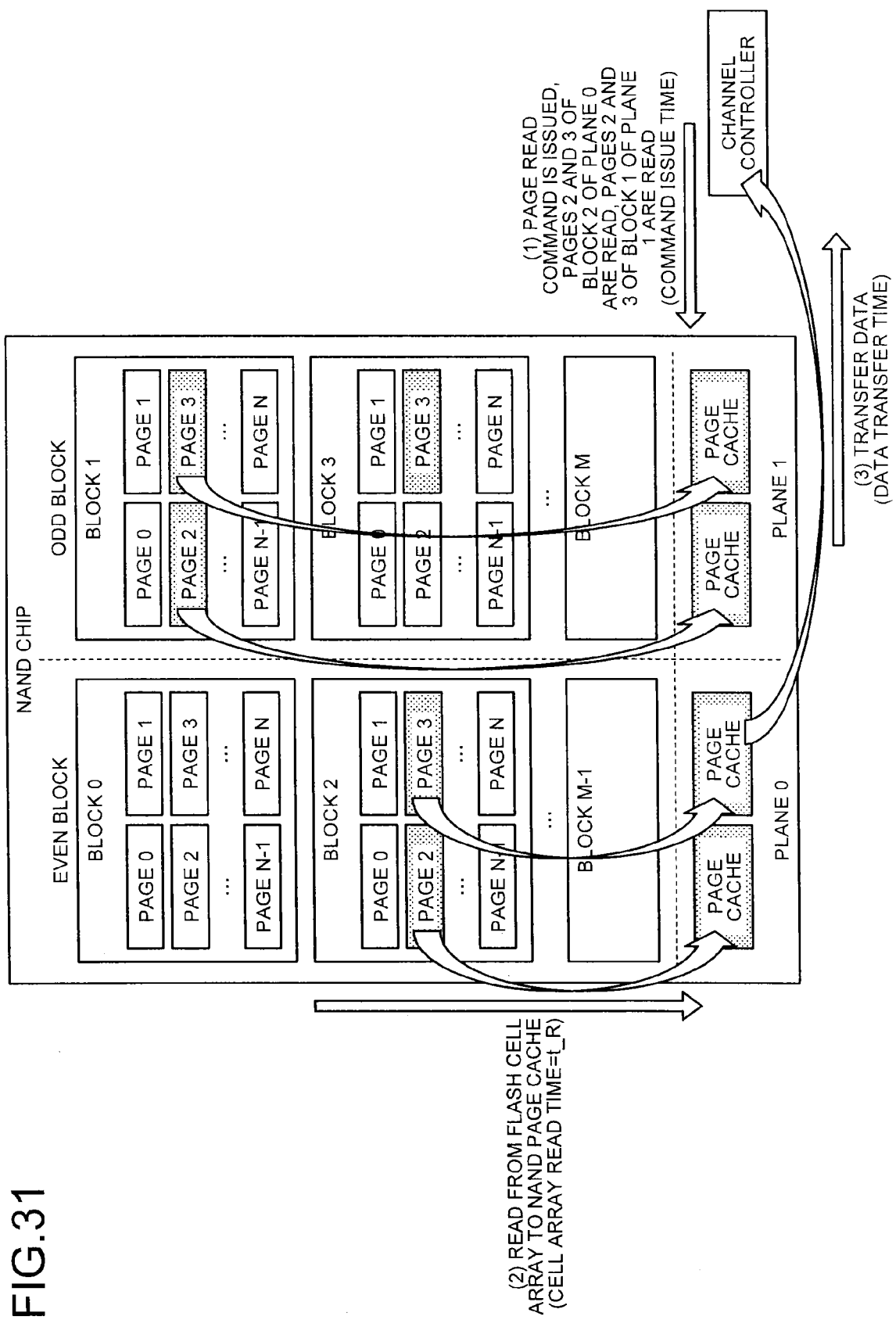
FIG. 31 is a diagram for explaining multi-plane read according to an embodiment.

The channel controllers 101 to 10n connected to the nonvolatile memory modules 201 to 20n have a multi-plane read function that realizes high-speed read by reading multiple pages simultaneously under specific conditions in addition to single-plane read. As illustrated in FIGS. 30 and 31, the nonvolatile memory modules 201 to 20n (NAND chips) each are divided into the two districts plane 0 and plane 1, each including a plurality of physical blocks. Planes 0 and 1 include independent peripheral circuits (for example, row decoders, column decoders, page buffers, data caches, and the like) and can perform erase, write, and read operations simultaneously, that is, can operate in parallel. The number of planes in one memory chip is not limited to two but optional. In single-plane read, as illustrated in FIG. 30, concurrent reading of page caches from only one plane is allowed. In contrast, in multi-plane read, as illustrated in FIG. 31, parallel reading of page caches from multi-planes is allowed. That is, parallel reading from different physical blocks in one nonvolatile memory module controlled by one channel controller is allowed. In multi-plane read, since parallel reading of page caches from multi-planes is allowed, the page cache read time from a nonvolatile memory cell array can be reduced as compared to single-plane read as illustrated in FIG. 29.

Figure 16:
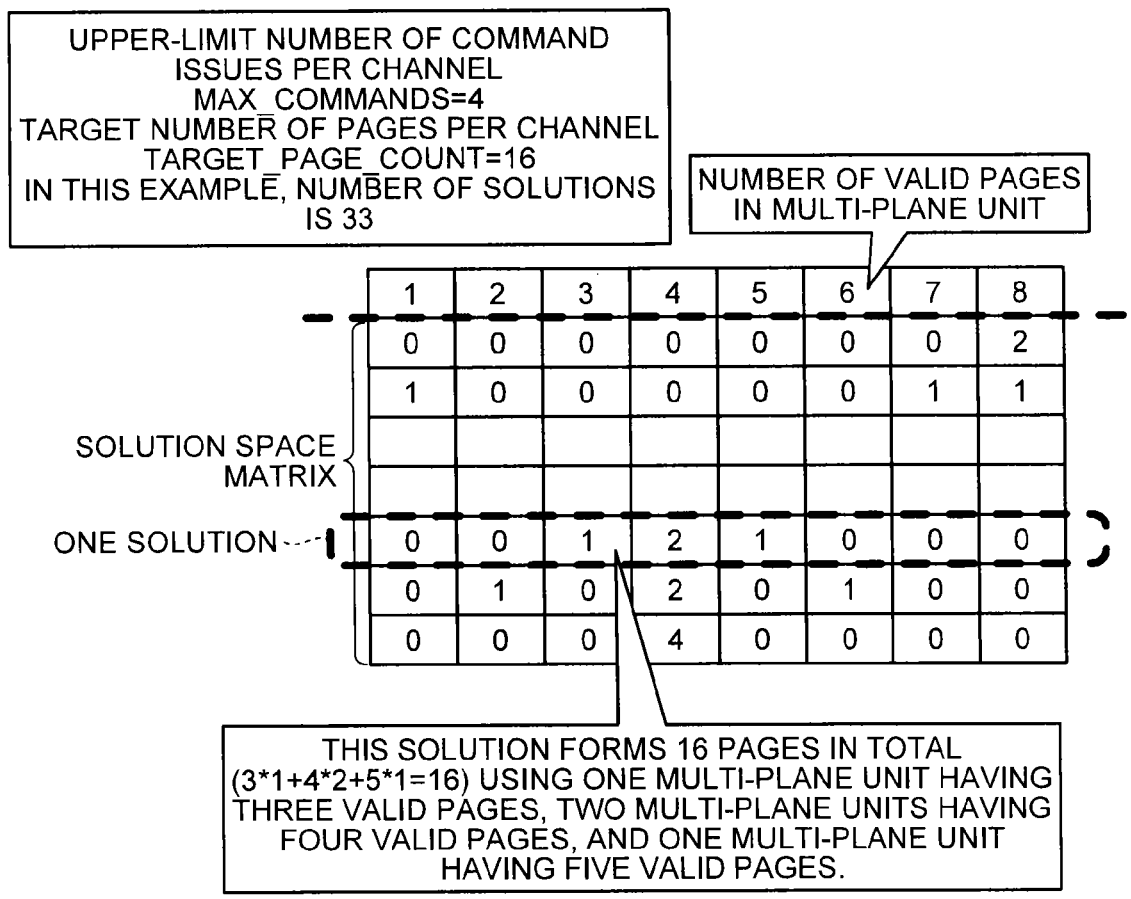
FIG. 16 is a diagram illustrating a solution space matrix according to an embodiment.
Figure 17:
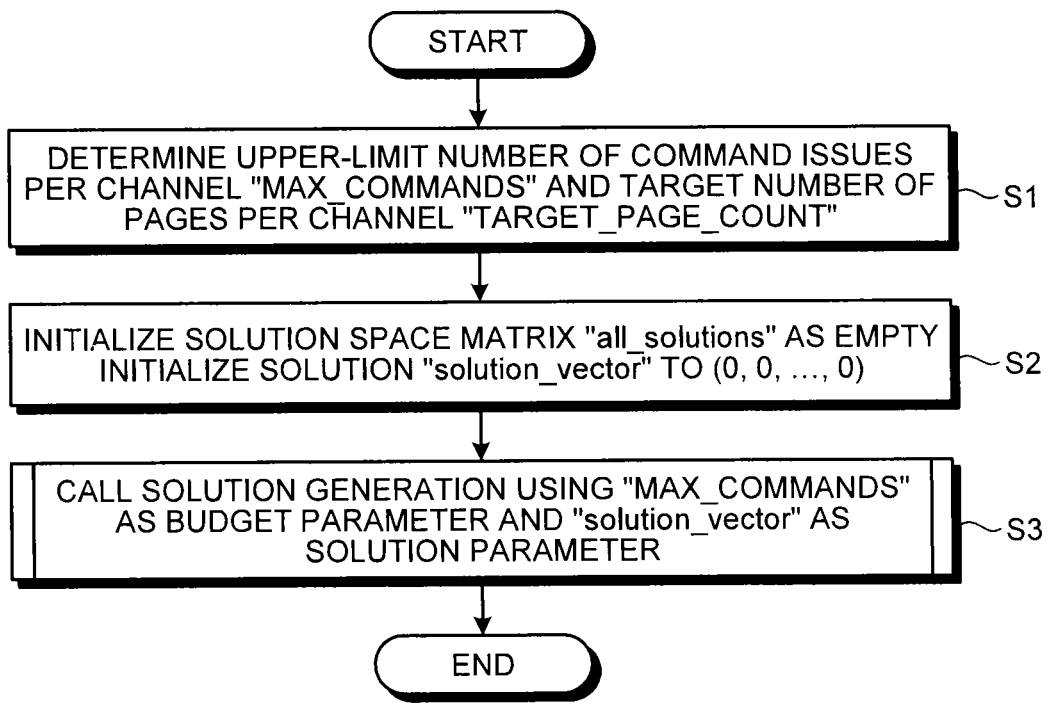
FIG. 17 illustrates a flowchart of solution space matrix generation according to an embodiment.
Figure 18:
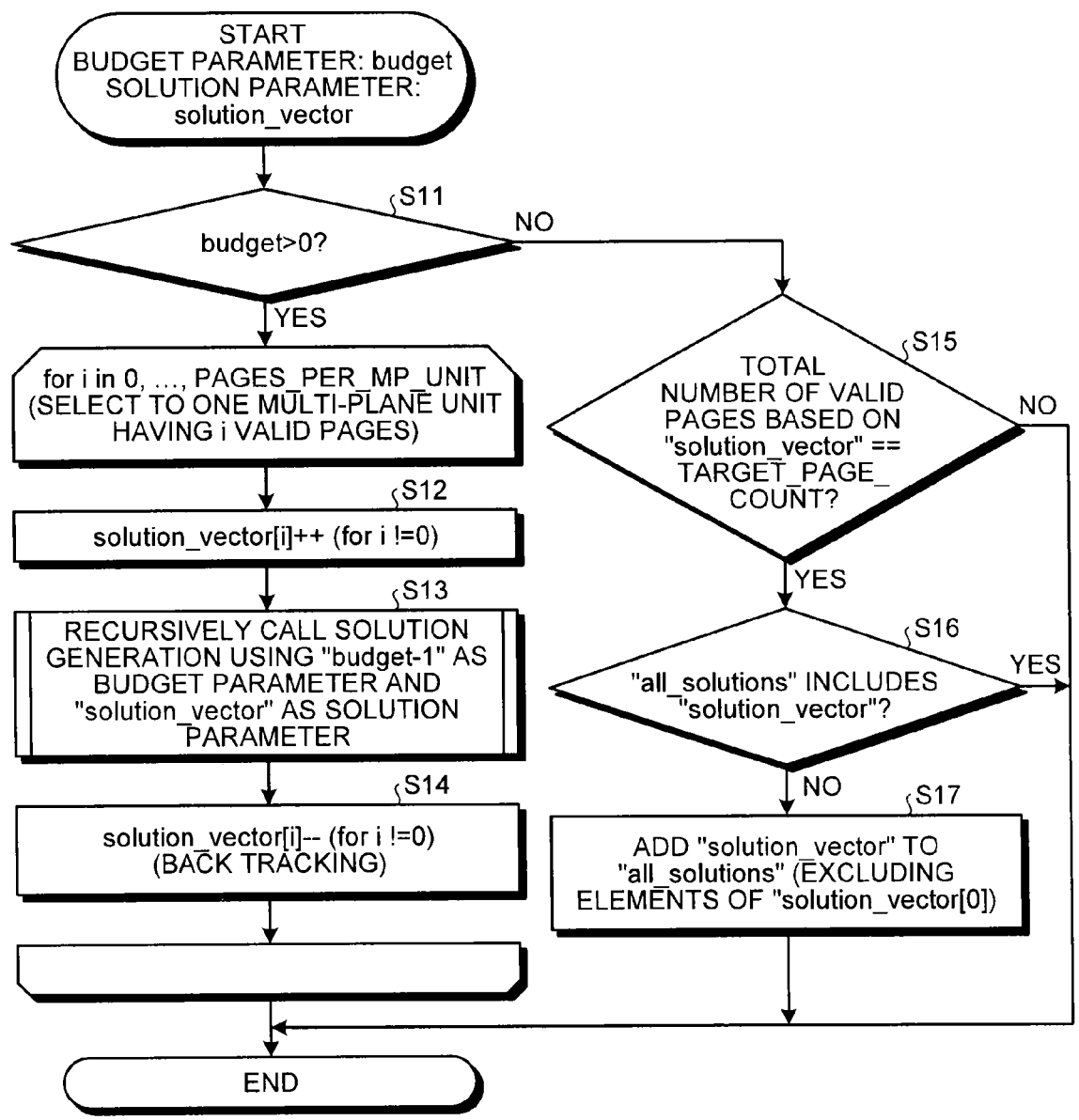
FIG. 18 illustrates a flowchart of solution generation according to an embodiment.

First, prior to normal startup of the memory system 10, a solution space matrix illustrated in FIG. 16 is generated according to a solution space matrix generation flowchart of FIG. 17 and a solution generation flowchart of FIG. 18. First, the upper-limit number of command issues per channel "MAX_COMMANDS" and a target number of pages per channel "TARGET_PAGE_COUNT" are determined (FIG. 17, step S1). Subsequently, a solution space matrix "all_solutions" is emptied and initialized, and a solution "solution_vector" is initialized to (0, 0, . . . , 0) (step S2). Moreover, the solution generation flowchart of FIG. 18 is called using "MAX_COMMANDS" as a budget parameter (a variable representing the number of usable multi-plane read commands) and "solution_vector" as a solution parameter (step S3). The solution generation flowchart starts with a given budget as a budget parameter and "solution_vector" as a solution parameter. In the initial read of solution generation, budget=MAX_COMMANDS. First, it is determined whether the "budget" is larger than zero (step S11). When the "budget" is larger than zero (Yes in step S11), "solution_vector[i]++" is executed for "i" (i=0, . . . , PAGES_PER_MP_UNIT) if "i" is other than zero (step S11), and solution generation is recursively called using "budget-1" as a budget parameter and a "solution_vector" as a solution parameter (step S12). If "i" is other than zero, "solution_vector[i]--" (back tracking) is executed (step S14). When the budget parameter "budget" is zero (No in step S11), it is determined whether the inner product between "solution_vector" and "(0, 1, . . . , PAGES_PER_MP_UNIT)", that is, a total number of valid pages based on "solution_vector" is the same as "TARGET_PAGE_COUNT" (step S15). If the two values are the same (Yes in step S15), it is determined whether the solution space matrix "all_solutions" includes the "solution_vector" (step S16). If the solution space matrix does not include the "solution_vector" (No in step S16), the "solution_vector" is added to the solution space matrix "all_solutions" (excluding the elements of "solution_vector[0]") (step S17), and the flow terminates. The flow also terminates in the case of "No" in step S15 and "Yes" in step S16.

A multi-plane unit is a data structure that represents a combination of valid pages in which multi-plane read is allowed as described above. In FIG. 3, a combination of physical pages arranged in the horizontal direction among the physical pages that constitute a logical page is a multi-plane unit. A multi-plane unit in each channel is composed of a number of physical pages corresponding to "PAGES_PER_MP_UNIT" (the number of pages in a multi-plane). Thus, in FIG. 2, "PAGES_PER_MP_UNIT"=4. Moreover, in FIG. 16, "PAGES_PER_MP_UNIT"=8. By one multi-plane read, one to "PAGES_PER_MP_UNIT" valid pages can be read. Here, the upper-limit number of allowable multi-plane read command issues per read task is the upper-limit number of command issues "MAX_COMMANDS". Although the larger the upper-limit number of command issues, the more flexibly solutions can be generated, since the search space increases, the scheduling computation cost increases.

A solution space matrix of the upper-limit number of command issues "MAX_COMMANDS" and the target total number of pages "TARGET_PAGE_COUNT" is a list of combinations capable of reading a total of TARGET_PAGE_COUNT pages by combining how many multi-plane units having how many valid pages when multi-plane read commands are issued MAX_COMMANDS times. The solution space matrix has the following structure.

As illustrated in FIG. 16, the solution space matrix "all_solutions" is a L (row)×N (column) matrix (L: the number of solutions in a solution space, N: PAGES_PER_MP_UNIT) present for a given TARGET_PAGE_COUNT. One row corresponds to one solution for a combination of multi-plane units in which a total number of pages is "TARGET_PAGE_COUNT". A m-th solution means that all_solutions (m,n) multi-plane units having n valid pages are consumed.

Here, the following relations are satisfied for m.

$$\text{sum}(i: 1, \ldots, \text{PAGES\_PER\_MP\_UNIT})$$
$$i * \text{all\_solutions}(m,i) = \text{TARGET\_PAGE\_COUNT}$$

$$\text{sum}(i: 1, \ldots, \text{PAGES\_PER\_MP\_UNIT}) \text{all\_solutions}$$
$$(m,i) <= \text{MAX\_COMMANDS}$$

In order to make the operation of the read task scheduler 40 robust, the solution space matrix is generated for three to four kinds of TARGET_PAGE_COUNT. For example, if the original target is TARGET_PAGE_COUNT=16, the solution space matrix is also generated for the cases of TARGET_PAGE_COUNT=15, 14, and 17. This is because a solution candidate matrix can be created for the cases of TARGET_PAGE_COUNT=15, 14, and 17 although a solution candidate matrix cannot be created exactly for TARGET_PAGE_COUNT=16, for example. The solution space matrix may be generated during startup of the memory system 10, and alternatively, may be incorporated as part of control data in advance during implementation. For example, if "PAGES_PER_MP_UNIT" (the number of pages in a multi-plane)=8, "MAX_COMMANDS" (the upper-limit number of command issues)=4, and "TARGET_PAGE_COUNT"=16, a solution space matrix having 33 rows (M=33) is obtained. The solution space matrix can be used in common for each channel. During startup of the memory system 10, one which can be realized in combination with the stock of buffers among the solution spaces is employed as a solution.

Figure 6:
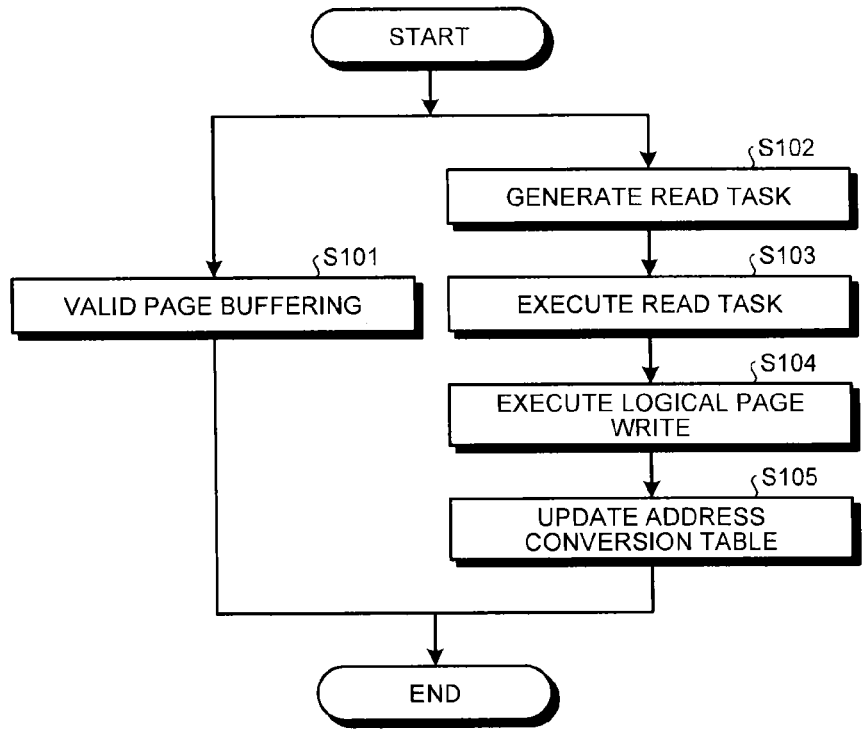
FIG. 6 illustrates a flowchart of a garbage collection process according to an embodiment.
Figure 7:
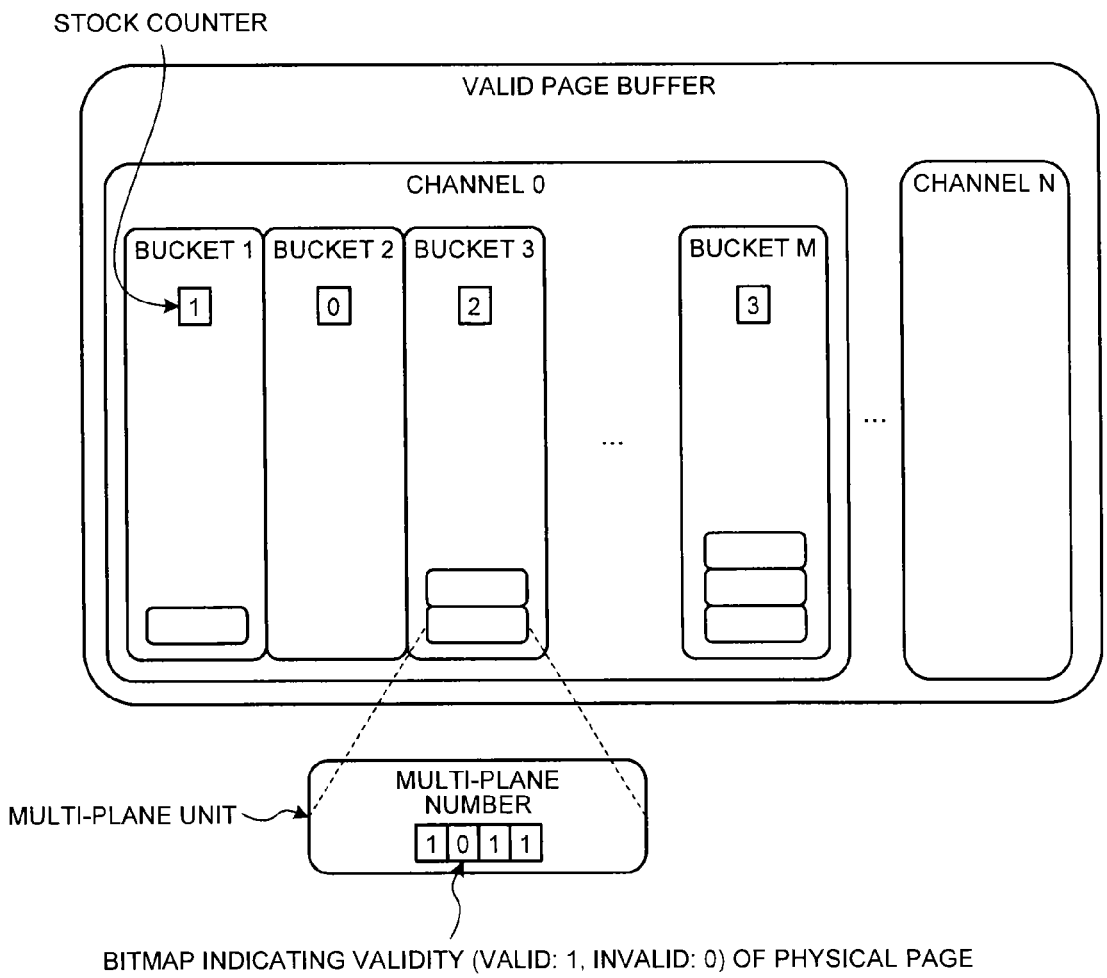
FIG. 7 illustrates a configuration of a valid page buffer according to a first embodiment.

FIG. 6 is a flowchart of a garbage collection process during startup of the memory system 10. First, in valid page buffering (step S101), the garbage collection control unit 21 searches valid pages of a block that is the source of garbage collection to perform buffering into a valid page buffer. FIG. 7 illustrates a configuration of a valid page buffer. The valid page buffer is a group of queues (called buckets) which are provided for each number of valid pages in a multi-plane and for each channel and in which a multi-plane unit (identification information) is a buffering element. Buckets are identified by a bucket number. Any multi-plane unit buffered in buckets has a number of valid pages corresponding to the bucket number. Moreover, each bucket has a stock counter representing how many multi-plane units are maintained in a bucket. In FIG. 7, for example, a number of multi-plane units corresponding to the number "3" of valid pages in channel 0 are accumulated in bucket 3 of channel 0. Since two multi-plane units are in this bucket, the stock counter is two. Similarly, a number of multi-plane units corresponding to the number "M" of valid pages in channel 0 are accumulated in bucket M of channel 0. Since three multi-plane units are in this bucket, the stock counter is three. The valid page buffer is provided on the DRAM 31, for example.

Although a nonvolatile memory module has a multi-plane read and program function, the management unit of valid pages in the conventional garbage collection was a single physical page. That is, conventionally, a validity determination was performed according to the order of logs in which logical pages were written, and buffering was performed for each channel in each valid page unit. However, since this order is not appropriate for multi-plane read accesses, it was not possible to apply multi-plane read to a multi-plane readable page group, but accesses were performed by repetition of single-plane reads. As a result, the reading process of garbage collection took a considerable amount of time. In the present embodiment, valid page buffering is executed according to the following method.

FIG. 11 illustrates the flowchart of valid page buffering according to the present embodiment. In the configuration of multi-plane units, in FIG. 5, the valid page determining unit 42 executes a valid page determination in a physical page unit (FIG. 11, step S201). A logical address of a physical page is converted into a physical address with reference to an address conversion table, the physical page is determined to be valid if the obtained physical address is the same as a physical address recorded in the logs, and otherwise, the physical page is determined to be invalid. Since the address conversion table manages physical addresses having the latest data corresponding to logical addresses, if the address conversion table does not indicate a physical address of the physical page, it means that the data of the physical page is already-overwritten invalid data. After that, sorting is performed in a multi-plane direction to form a multi-plane unit (step S202). As illustrated in FIG. 5, data of a logical page is arranged in a physical page in the order of numbers. Although physical pages are recorded in the order of logs, the physical pages are rearranged for each channel and one row of the physical pages is a pack of multi-plane units. In a memory system that supports channel-parallel access, with the aim to improve sequential read performances after sequential write, pages are written in the order (1, 2, 3, . . . ) of the channel-parallel direction, and logs representing what is written to which physical page of a nonvolatile memory are also conventionally in the order of the channel-parallel direction. Since logs are used in order to obviate mismatch of the address conversion table when a sudden power failure occurs, the recording order of logs needs to be the same as the recording order of pages. During the garbage collection process, since a validity determination on physical page data is conventionally performed using the logs, valid pages are arranged in the order of the channel-parallel direction and thus the arrangement order of valid pages is not the same as the order of a multi-plane unit direction as it is. Therefore, in the present embodiment, the arrangement order of valid pages is changed from the order (1, 2, 3, . . . ) of the channel-parallel direction to the order (1, 5, 9, 13, 2, 6, 10, 14, . . . ) of the multi-plane direction, and the valid pages are managed by the valid page buffer in the multi-plane units. Moreover, in order to classify the multi-plane units later, how many valid pages are included in a multi-plane unit is counted.

Subsequently, multi-plane units are classified for each channel (step S203) and are buffered into a bucket corresponding to the number of valid pages in a valid page buffer (step S204). In this case, the stock counter of a bucket is also updated. A multi-plane unit that does not include any valid page is discarded.

Figure 22:
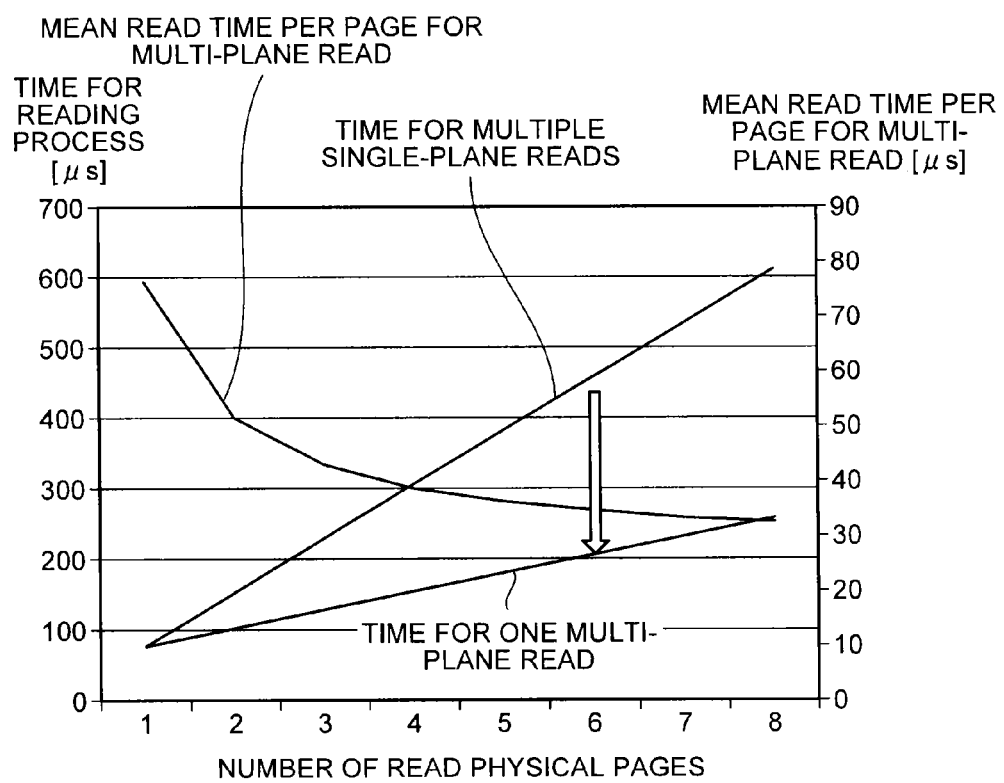
FIG. 22 is a diagram illustrating a relation between the number of read physical pages and the read time according to an embodiment.
Figure 23:
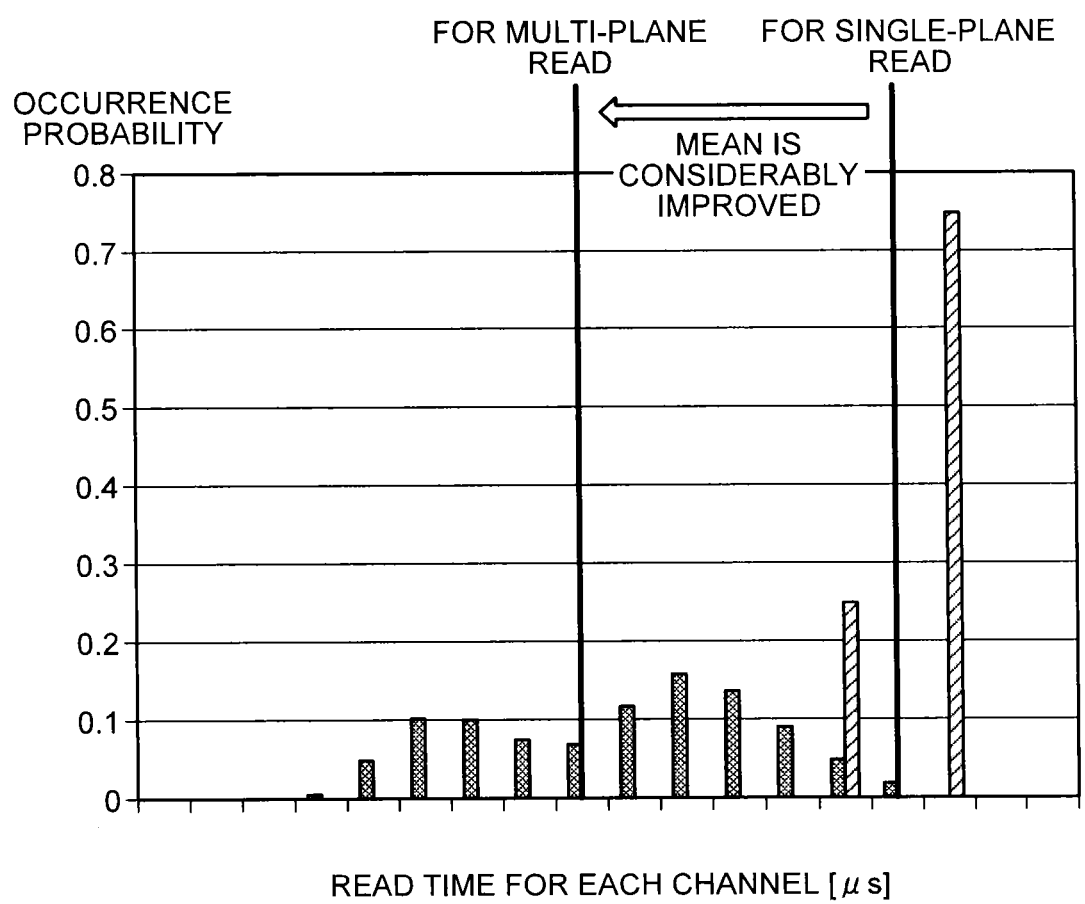
FIG. 23 is a diagram illustrating an occurrence probability of the read time of each channel according to an embodiment.
Figure 24:
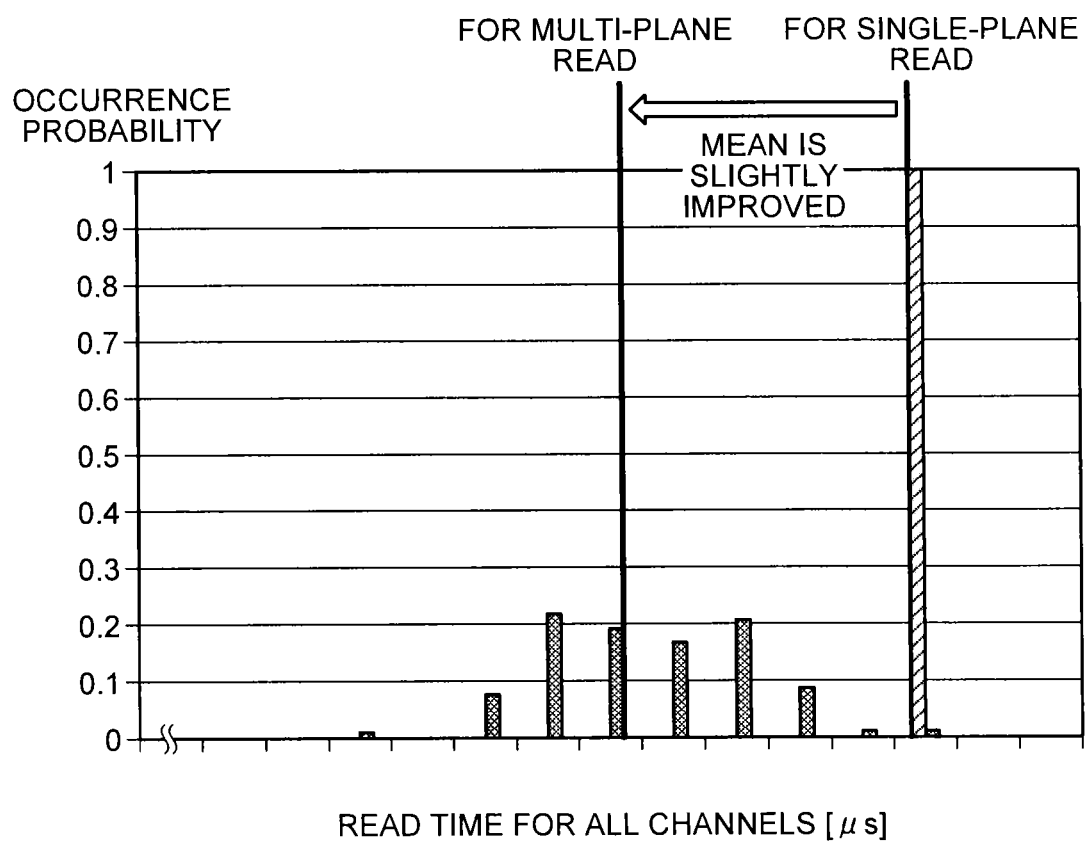
FIG. 24 is a diagram illustrating an occurrence probability of the read time for all channels according to an embodiment.

FIG. 22 illustrates the read time depending on a physical page that is read. FIG. 23 illustrates an occurrence probability of the read time of each channel for the cases of multi-plane read and single-plane read. In FIG. 23, the mean values of the read time of respective channels for the cases of multi-plane read and single-plane read are also illustrated. FIG. 24 illustrates an occurrence probability of the read time for all channels for the cases of multi-plane read and single-plane read. In FIG. 24, the mean values of the read time for all channels for the cases of multi-plane read and single-plane read are also illustrated. As illustrated in FIG. 23, due to employment of multi-plane read, the read time of respective channels per page is reduced. As can be understood from FIG. 24, however, since the read time for all channels in the garbage collection process is determined by the largest value of the read time of the respective channels, the read time for all channels is not reduced too much if a variation in the read time of each channel is large. For example, if control is performed simply such that the number of multi-plane units read in each channel is constant, the number of read valid pages may vary from channel to channel. The transfer time from a page cache to a memory controller (the write buffer 16) is proportional to the number of physical pages (that is, valid pages) that are to be transferred. As a result, the read time of each channel varies considerably, and consequently, the degree of reduction in the read time for all channels is low as illustrated in FIG. 24 as compared to the degree of reduction in the read time per channel in FIG. 23.

Figure 8:
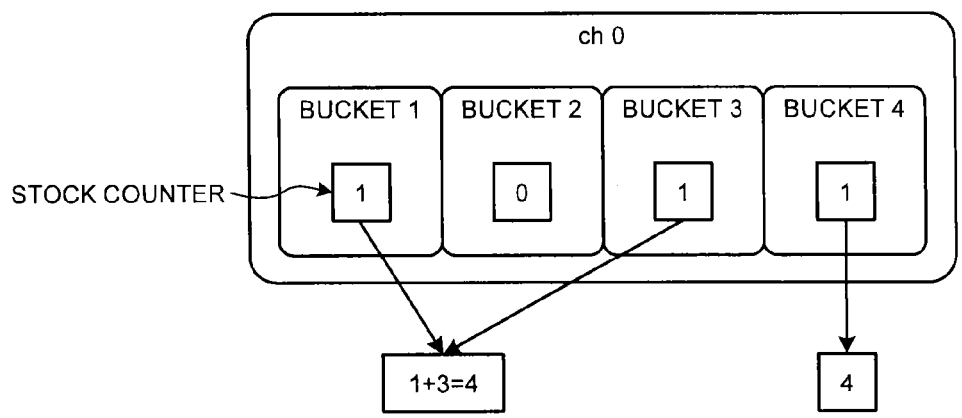
FIG. 8 is a diagram illustrating how the sum of the numbers of valid pages in a multi-plane unit is equalized to a constant value according to an embodiment.

Therefore, in the present embodiment, as illustrated below, control is performed such that the number of pages read into the memory controller (the write buffer 16) for each channel has a constant value, and that such values are equalized in all channels, whereby a variation in the read time of respective channels is suppressed. That is, as illustrated in FIG. 8, the stocks in buckets are checked, and several multi-plane units are acquired from each bucket so that the sum (the total number of pages) of the numbers of valid pages in a multi-plane unit has a constant value.

Read task generation (step S102) is performed in parallel with valid page buffering (step S101 of FIG. 6). The read task scheduler 40 generates a solution candidate matrix from a solution space matrix and the value of a present stock counter and calculates a score vector of solutions from the solution candidate matrix and the value of the stock counter to thereby obtain a solution vector "solution" that is a combination of multi-plane units.

Figure 13:
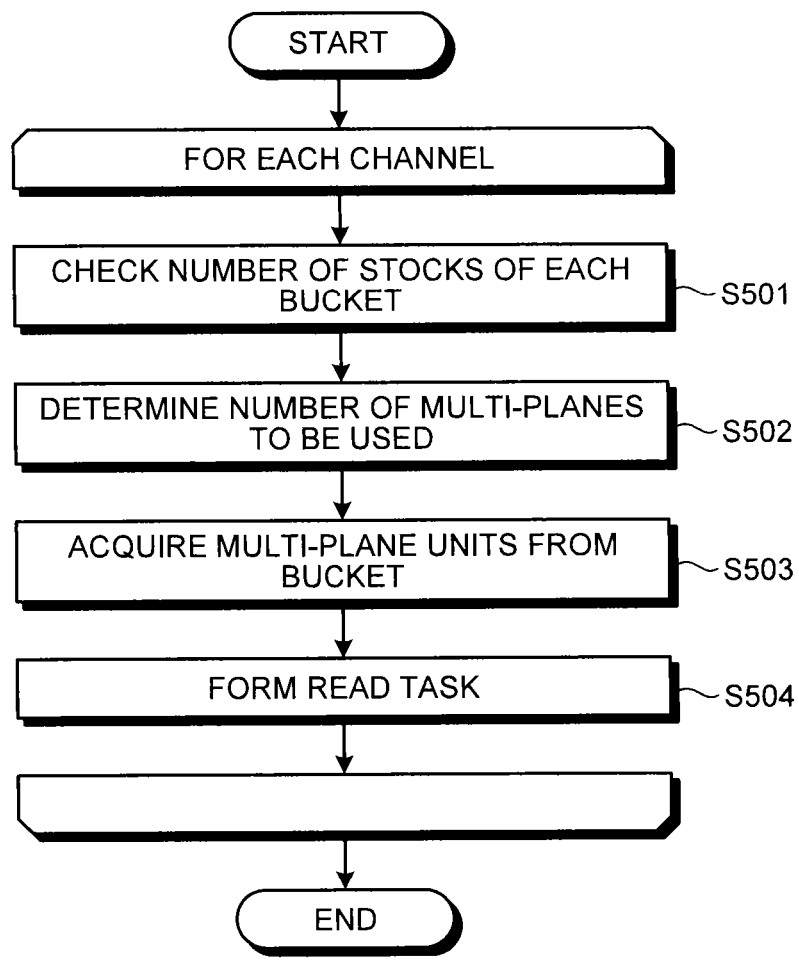
FIG. 13 illustrates another flowchart of read task generation according to an embodiment.
Figure 21:
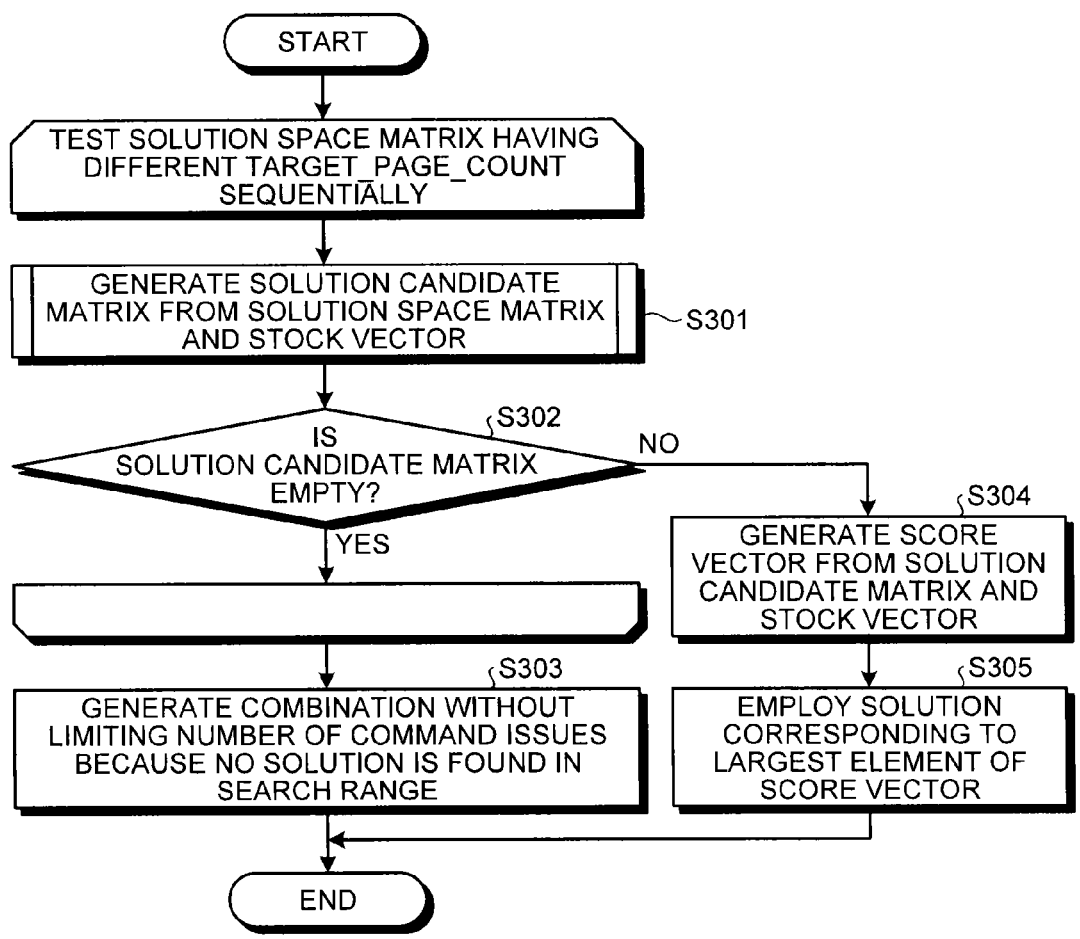
FIG. 21 illustrates a flowchart of selection of a solution according to an embodiment.

FIG. 13 illustrates a flowchart of read task generation according to the present embodiment. The read task scheduler 40 checks the number of stocks of each bucket at the present time for each channel based on a solution space matrix generated in advance (step S501) and determines a combination of multi-plane units to be used from the solution space matrix and the present value of the stock counter (step S502). FIG. 21 illustrates the flowchart of solution selection in step S502.

Figure 20:
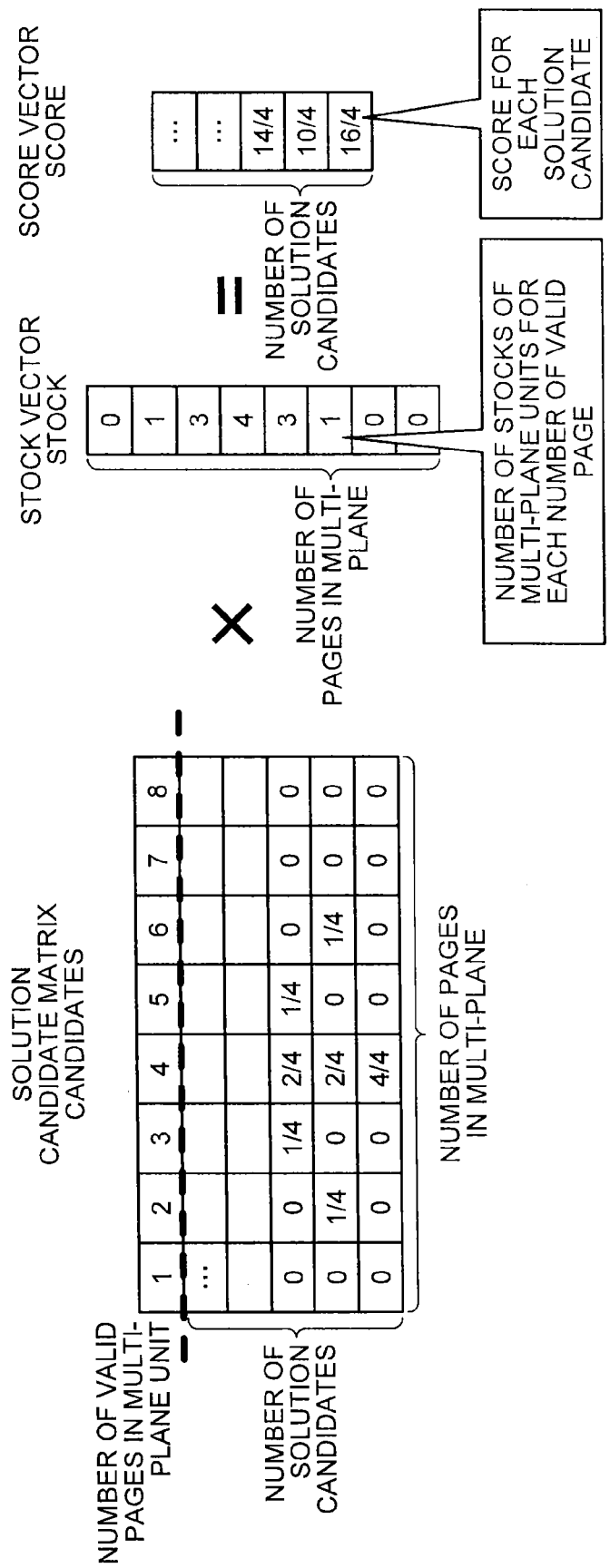
FIG. 20 illustrates a method of calculating a score vector according to an embodiment.

Prior to description of solution candidate matrix generation, a stock vector is defined as follows. As illustrated in FIG. 20, a stock vector is such a column vector that an i-th element (i: 1, . . . , PAGES_PER_MP_UNIT) is the number of stocks of a multi-plane unit bucket that includes "i" valid pages (=Stock_i).

First, a solution candidate matrix is generated from a solution space matrix of FIG. 16 for a certain value of TARGET_PAGE_COUNT and a stock vector (FIG. 21, step S301). A solution candidate matrix "candidates" is an M (row)×N (column) matrix (M: the number of solution candidates, N: PAGES_PER_MP_UNIT). Although one row corresponds to one solution for a combination of multi-plane units in which a total number of pages is "TARGET_PAGE_COUNT", elements are normalized for each row, for score calculation to be described later.

Figure 19:
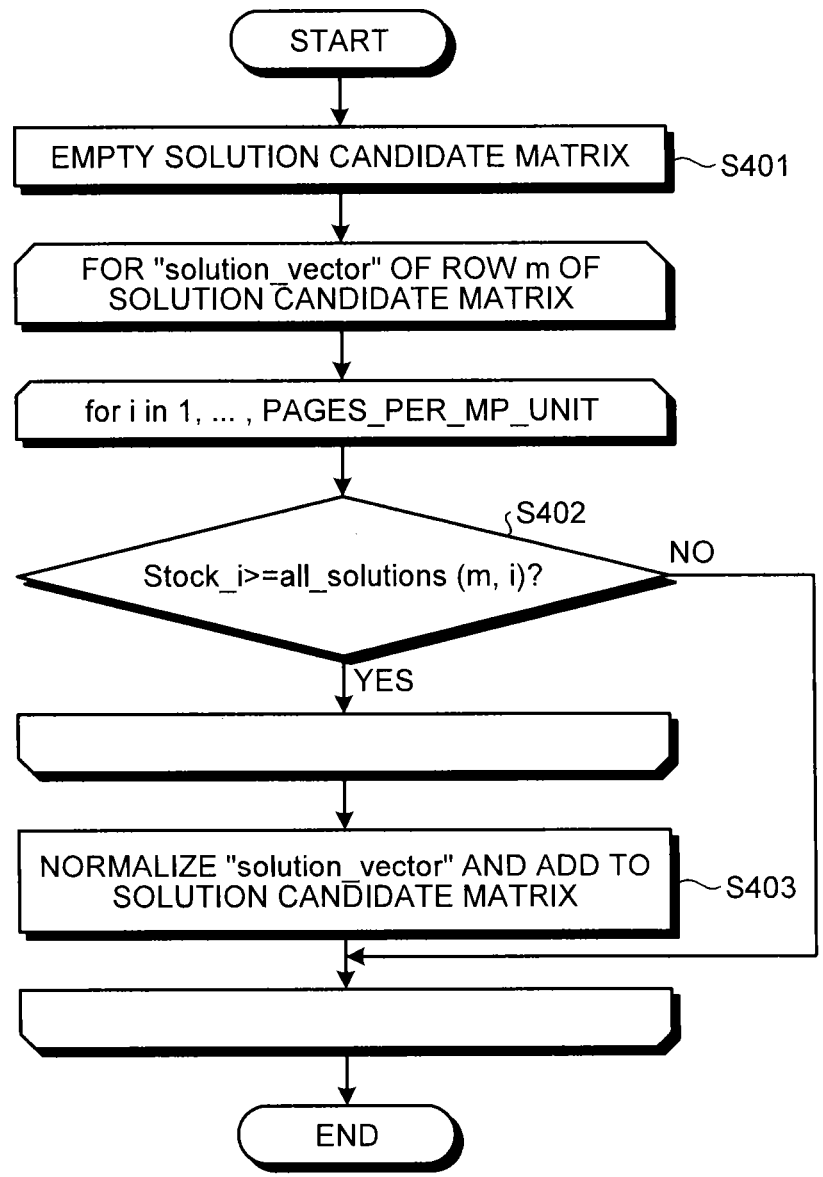
FIG. 19 illustrates a flowchart of generation of a solution candidate matrix according to an embodiment.

The flowchart of solution candidate matrix generation (FIG. 21, step S301) is illustrated in detail in FIG. 19. In FIG. 19, rows that obtain more multi-plane units than the present number of stocks within a solution space matrix are removed.

First, the solution candidate matrix is in an empty state (FIG. 19, step S401). Moreover, for a certain row "m" of the solution space matrix, it is determined whether the following relation is satisfied for all columns "i" (i: 1, . . . , PAGES_PER_MP_UNIT) (step S402).

Stock_$i$>=all_solutions($m,i$)

If the above relation is not satisfied for any of the elements "i" (No in step S402), the same determination is performed with respect to the next row (m+1) of the solution space matrix. If the above relation is satisfied for all elements "i" (Yes in step S402), the respective elements "all_solutions (m,i)" of the row "m" are divided by the sum "sum (i: 1, . . . , PAGES_PER_MP_UNIT) all_solutions (m,i)" in the row "m" to thereby normalize the elements for each row, and the normalized elements are added to the solution candidate matrix (step S403). After that, the same operation is executed for the next row "m+1" of the solution space matrix. When the above operation is executed for all rows (all solutions) of all solution space matrices, step S301 of FIG. 21 terminates. By the normalization in step S403, as illustrated in FIG. 20, the following relation is satisfied in all rows "m".

sum($i$: 1, . . . ,PAGES_PER_MP_UNIT)candidates($m, i$)=1

After step S301, it is determined in step S302 whether the solution candidate matrix is empty. Depending on the state of the number of stocks "Stock_i", the solution candidate matrix for a certain value of TARGET_PAGE_COUNT may be empty (Yes in step S302). In such a case, the same determination is performed sequentially for solution space matrices having different multiple values of TARGET_PAGE_COUNT. For example, solution candidates where TARGET_PAGE_COUNT=16 are searched for in a certain channel, and if such candidates are not found, the cases of TARGET_PAGE_COUNT=15 and 14 are searched for. If the solution candidate matrix is empty for all searched values of TARGET_PAGE_COUNT, the control to make the read time constant is not performed (step S303). That is, just simply, pages are appropriately extracted from the stock of multi-plane units regardless of the upper-limit number of command issues "MAX_COMMANDS" without exceeding the target total number of pages to thereby generate a read task (step S303). For example, multi-page units are extracted one by one sequentially from buckets having the largest number of stocks, and generation of a read task is completed immediately before the total number of pages exceeds the target number of pages. However, in a normal operation state, when the valid page percentage in a block that is the source of garbage collection is approximately 0.6, such a situation rarely occurs.

When the solution candidate matrix is not empty (step S302: No), the stock vector is multiplied by the solution candidate matrix to obtain the score vector (step S304). As illustrated in FIG. 20, the score vector is a vector which has a number of elements corresponding to the number (NUM_CANDIDATES) of solution candidates of the solution candidate matrix and is a vector in which an i-th element (i=1, . . . , NUM_CANDIDATES) has the value of Score_i as below.

Score_$i$=sum($j$: 1, . . . ,PAGES_PER_MP)(candidates($i,j$)*Stock_$j$)

The value of a j-th element of the score vector is the score of a j-th solution candidate and represents the closeness between a distribution of the number of multi-plane units consumed by a solution candidate and a distribution of the number of multi-plane units in stock. That is, the closer the two distributions, the larger the value of the score. A solution candidate having the higher score means that the solution candidate is more likely to be continuously selected than a solution candidate having the lower score. That is, by selecting solution candidates having the higher score, it is possible to prevent the number of stocks in a specific bucket from increasing or decreasing too much to obtain no solution. Thus, if an element having the largest score among the elements of the score vector is the j-th element, the row of the solution space matrix corresponding to the j-th row of the solution candidate matrix is extracted and used as a solution vector "solution" (step S305). Based on this solution vector "solution", a number of multi-plane units corresponding to "solution i" which is the respective element of the solution vector "solution" are acquired from an i-th bucket (FIG. 13, step S503) to form the read task (step S504). One multi-plane unit becomes one multi-plane read task, and the read task is composed of a plurality of multi-plane read tasks. The stock counter is updated a number of times corresponding to the number of acquired multi-plane units.

Subsequently, in read task execution (step S103), the read task execution control unit 41 executes reading of valid pages from the nonvolatile memory modules 201 to 20$n$ in a channel-parallel manner.

The channel controller executes the following two steps of processes with respect to the nonvolatile memory modules 201 to 20$n$ when executing the reading of physical pages.

(1) The channel controller executes reading into a page cache which is a volatile memory provided in each of the nonvolatile memory modules 201 to 20$n$ from the nonvolatile memory cell arrays of the nonvolatile memory modules 201 to 20$n$ in a nonvolatile memory chip (this reading takes approximately t_R=50 μs to 60 μs).

(2) The channel controller transfers the read data from a page cache provided in each of the nonvolatile memory modules 201 to 20$n$ to the channel controllers 101 to 10$n$ in the controller chip (this transfer takes approximately 20 μs per four KB).

The reading process (1) from the nonvolatile memory cell arrays can select any one of single-plane read with respect to single physical pages and multi-plane read with respect to a plurality of physical pages (multi-plane). Moreover, the transfer process (2) can be performed with respect to the data of a selected optional physical page. When a read request or a write request for another multi-plane is executed on this nonvolatile memory chip, the content of a page cache may be lost. In this case, a read process from a memory cell array needs to be performed again at the time of requesting reading of the next physical page. The valid data transferred to the channel controllers 101 to 10$n$ is then temporarily accumulated in the write buffer 16, and after that, is written to the nonvolatile memory modules 201 to 20$n$ (this is a garbage collection process).

Figure 15:
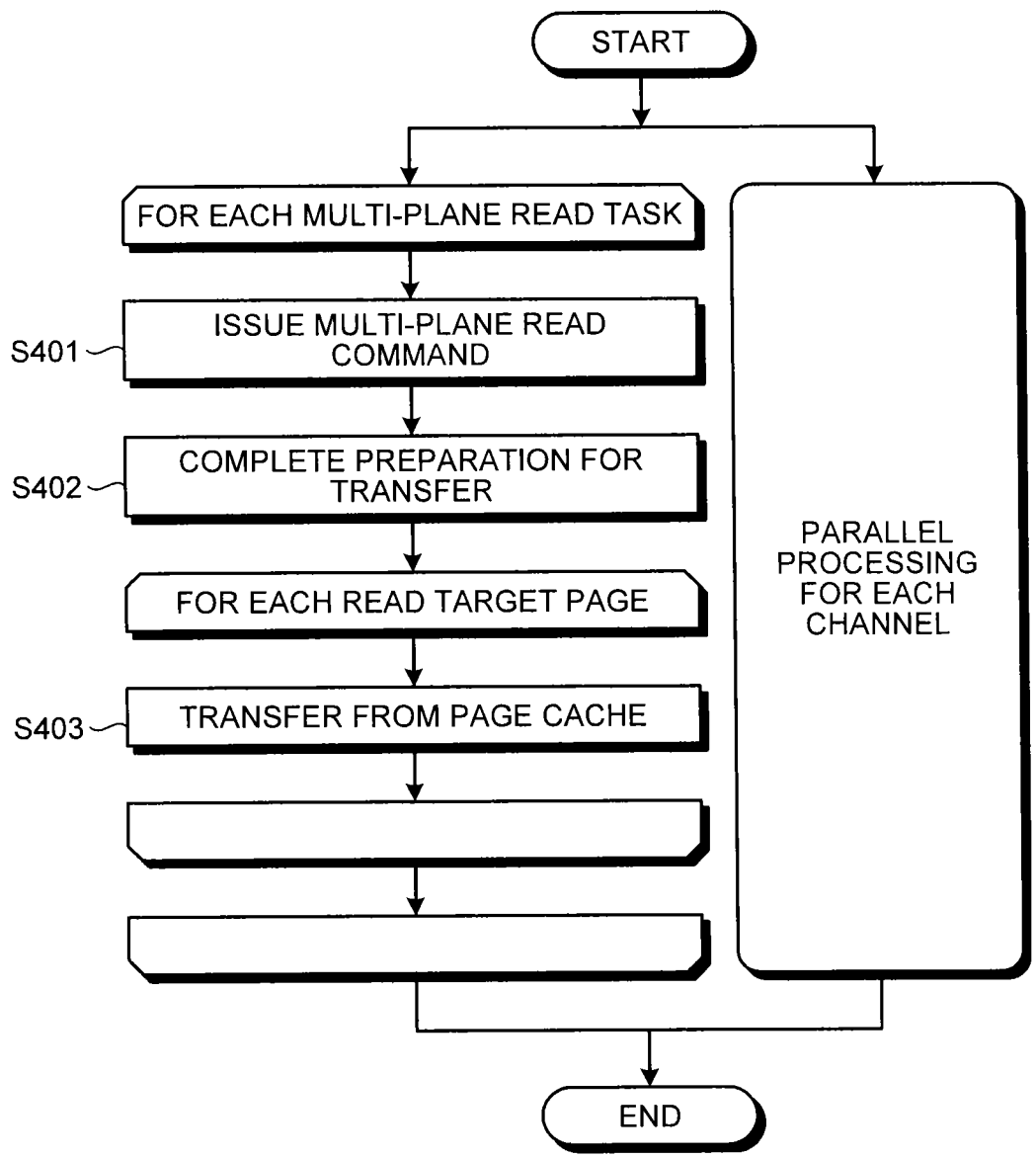
FIG. 15 illustrates another flowchart of read task execution according to an embodiment.

FIG. 15 illustrates the flowchart of read task execution. The read task execution control unit 41 issues a multi-plane read command for each multi-plane read task in the read task (FIG. 15, step S401). When preparations for transfer are completed (step S402), the read task execution control unit 41 transfers valid page portions within the multi-plane unit from the page cache (step S403). In the conventional technique, the read task was executed with a number of single-plane reads. In contrast, in the present embodiment, since reading is executed with a smaller number of multi-plane reads than the conventional technique, it is possible to reduce the read time for each channel. After read task execution (step S103), in logical page writing execution (step S104), the read valid pages are written to the nonvolatile memory modules 201 to 20$n$ in a channel-parallel manner. Subsequently, address conversion table updating (step S105) is performed with respect to the valid pages written to the nonvolatile memory modules 201 to 20$n$, and the garbage collection process is completed.

Figure 14:
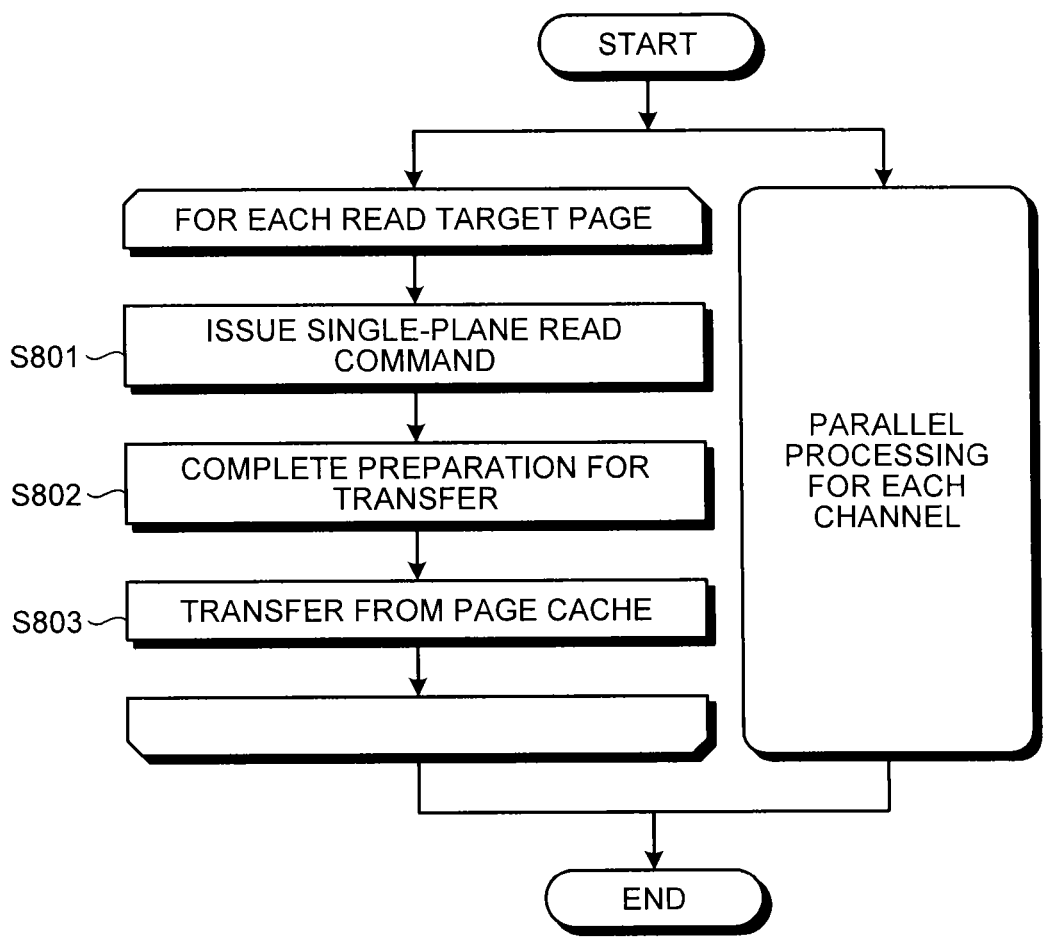
FIG. 14 illustrates a flowchart of read task execution according to an embodiment.

When all reading operations are executed with a number of single-plane reads, as illustrated in FIG. 10, in the valid page buffering, a valid page determination is executed (step S601), valid pages are classified for each channel (step S602), and the valid pages are stored in a valid page buffer (step S603). Further, as illustrated in FIG. 12, in the read task generation, the stock of the valid page buffer is checked (step S701) for each channel, a predetermined number of valid pages are acquired from the buffer (step S702), and the read task is formed (step S703). Moreover, in the read task execution, as illustrated in FIG. 14, a single-plane read command is issued for each valid page to perform reading (step S801), and when preparations for transfer are completed (step S802), the valid pages are transferred from the page cache (step S803). In write task execution, the predetermined number of read valid pages are written to the nonvolatile memory module.

Figure 9:
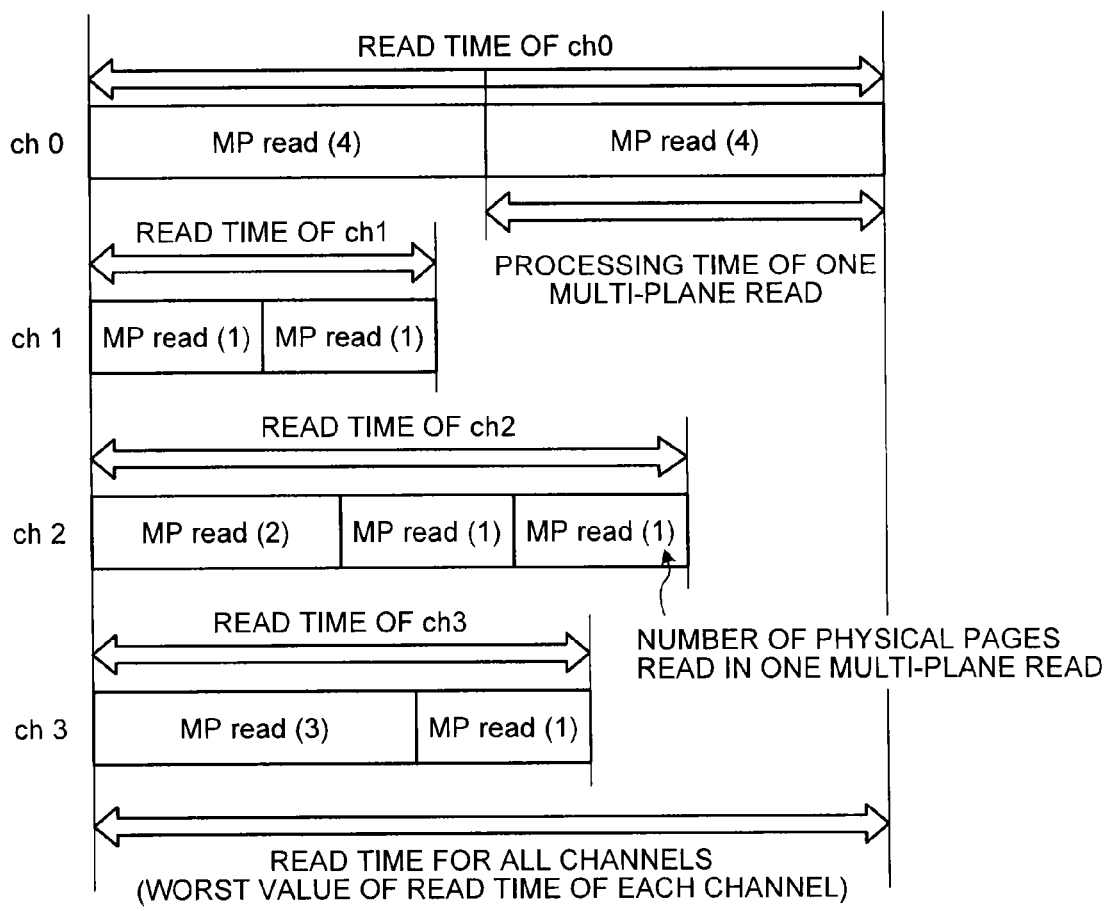
FIG. 9 is a diagram for explaining the read time for all channels according to an embodiment.

In the present embodiment, a combination of multi-plane readable pages is managed as a multi-plane unit, whereby reading is performed with a smaller number of multi-plane reads than the single-plane read. FIG. 22 is a diagram illustrating a relation between the number of read physical pages and the read time. If the number of read physical pages is the same, the read time can be reduced by reading physical pages with one multi-plane read rather than reading with multiple single-plane reads. Further, the larger the number of read physical pages, that is, the larger the number of pages read with one multi-plane read, the mean read time per page in the multi-plane read can be reduced. As a result, the read time for each channel can be reduced as illustrated in FIG. 23. As illustrated in FIG. 23, the mean read time for each channel after application of multi-plane read can be reduced remarkably as compared to the case of single-plane read that does not use multi-plane read. However, in multi-plane read, the ratio of valid pages to invalid pages in parallel reading of a plurality of physical pages in reading from a nonvolatile memory cell array to a page cache is not constant in respective multi-plane reads. Thus, with introduction of multi-plane read only, the read time from the page cache to the memory controller (the write buffer 16) varies in each channel by reflecting a variation in the number of valid pages read for each channel, and a variation in the read time for each channel cannot be suppressed. As illustrated in FIG. 9, since the read time for all channels is determined by the worst value of the read time for each channel, the reduction effect of the read time for all channels is limited. As illustrated in FIG. 24, the mean value of the read time for all channels after application of multi-plane read remains at a slight improvement as compared to single-plane read.

Figure 25:
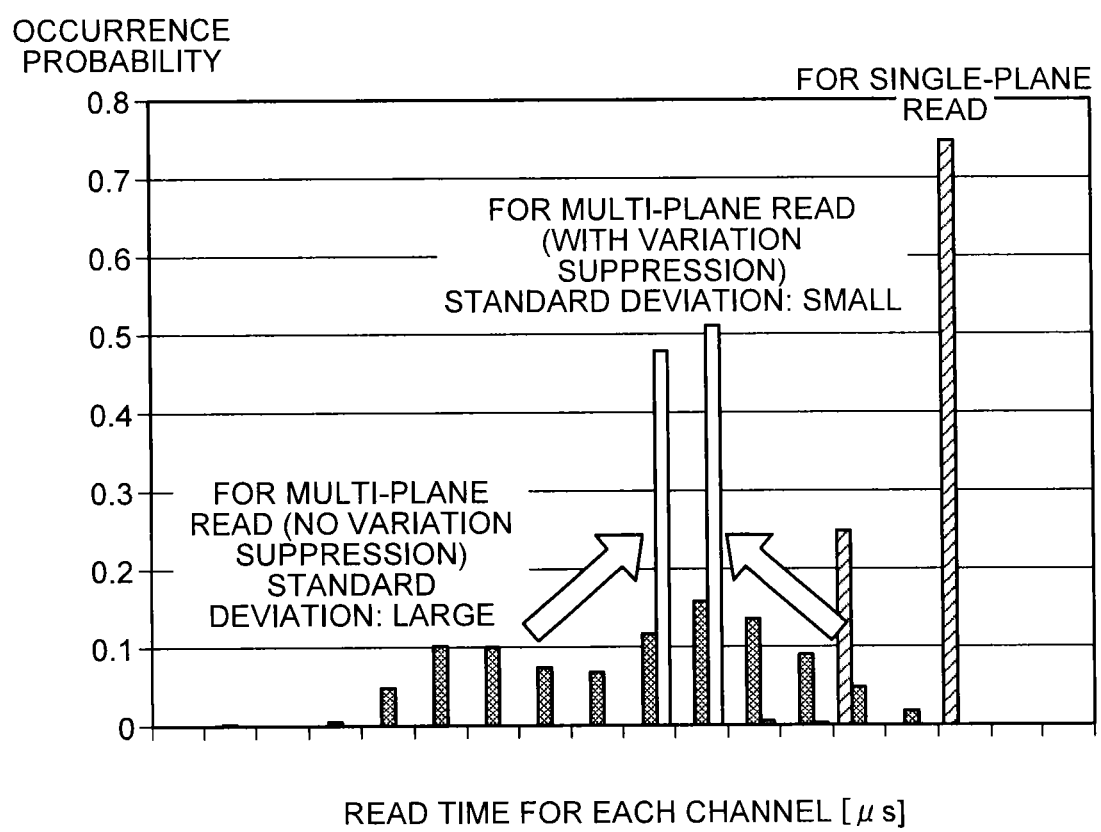
FIG. 25 is a diagram illustrating an occurrence probability of the read time of each channel according to an embodiment.
Figure 26:
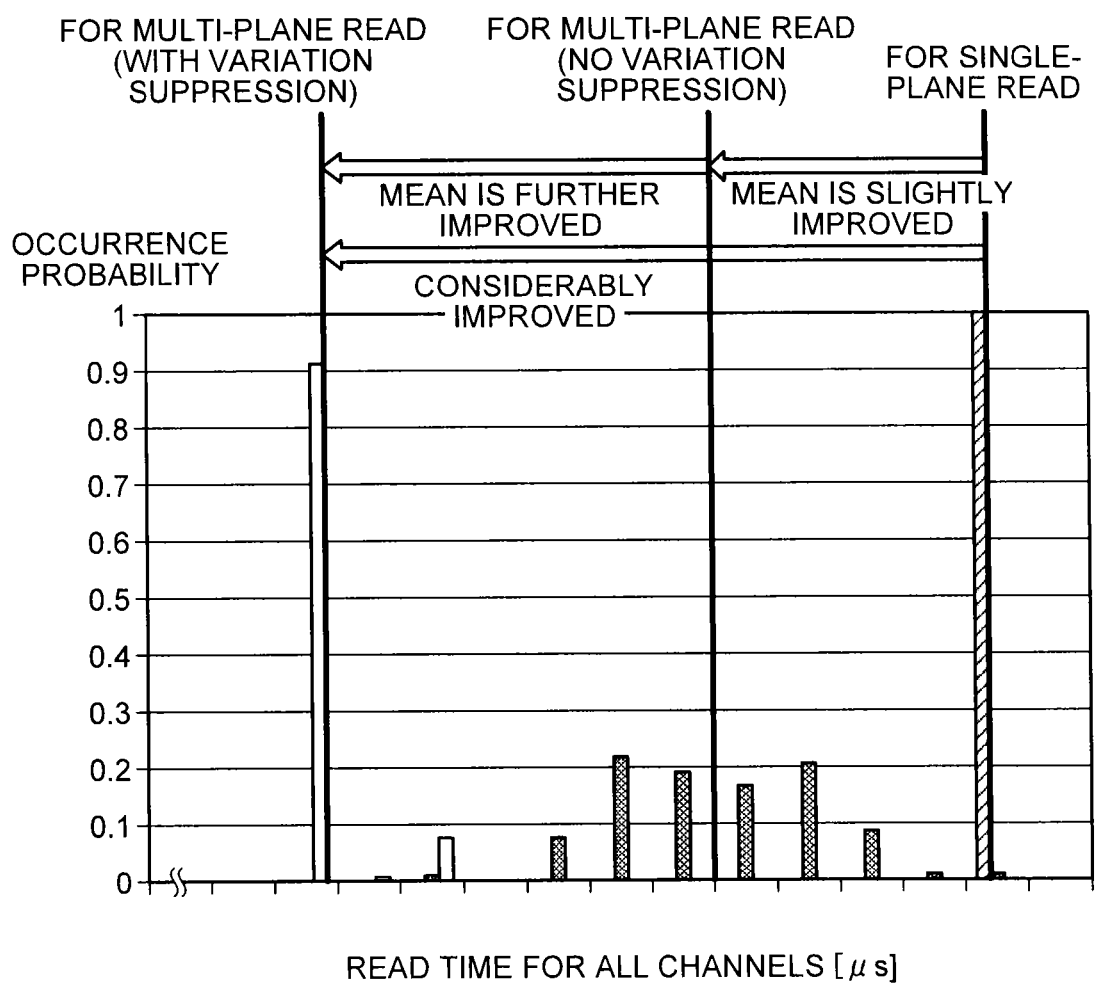
FIG. 26 is a diagram illustrating an occurrence probability of the read time for all channels according to an embodiment.

Therefore, the garbage collection control unit 21 according to the present embodiment performs control such that the number of read valid pages for each channel is constant in order to suppress a variation in the read time between channels in the read task execution (step S103) necessary for one logical page recording execution (step S104) executed in the channel-parallel manner. Due to this, it is possible to suppress a variation in the read time of the valid pages from the page cache to the channel controller and to reduce a variation in the read time for each channel. Moreover, by providing the upper-limit number of multi-plane read command issues, it is possible to suppress a variation in the read time from the nonvolatile memory cell array to the page cache. As a result, it is possible to further reduce the read time for all channels. By performing control such that the number of pages read for each channel in the multi-plane read becomes constant, a variation in the read time for each channel can be reduced from a large standard deviation to a small standard deviation as illustrated in FIG. 25. As a result, as illustrated in FIG. 26, the mean value of the read time for all channels can be reduced remarkably as compared to single-plane read.

As described above, in the present embodiment, in reading of the garbage collection process, the upper-limit number of multi-plane read command issues for each channel is provided, and the number of valid pages read in each channel is equalized, whereby the read time for each channel is uniformized. Due to this, the read time for all channels can be reduced, the entire time of the garbage collection process can be reduced, and the writing performance from the host can be improved.

Second Embodiment

Figure 27:
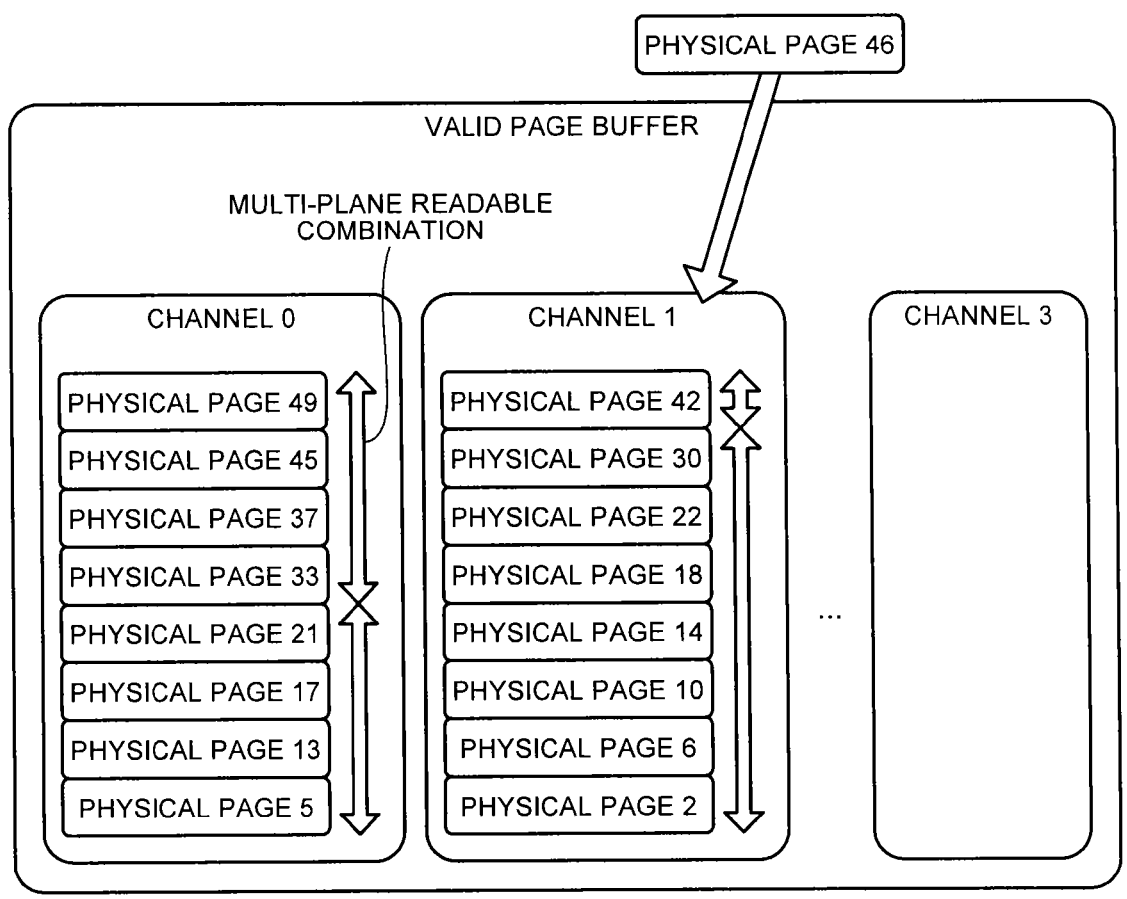
FIG. 27 illustrates a configuration of a valid page buffer according to a second embodiment.

The flow of valid page buffering (FIG. 6, step S101) according to the present embodiment is illustrated. In read task execution (step S103) of the present embodiment, although control is performed such that the number of pages read in each channel becomes constant, the valid page buffer has a simpler configuration as illustrated in FIG. 27 than the first embodiment. That is, although a buffer is provided in each channel, unlike FIG. 7, a physical page unit queue is provided in each channel. A buffering element of the valid page buffer is the physical address of a valid page. Moreover, the addresses of physical pages which are valid pages of a block that is the source of a garbage collection are buffered into a buffer of each channel. During the buffering, which group in which physical pages are combined belongs to one multi-plane unit is not taken into consideration.

The valid page determining unit 42 extracts physical addresses of valid pages from the logs of the logical pages which are the source of garbage collection and stores the same in a valid page buffer in the following order according to the flowchart of valid page buffering of FIG. 10. First, the logs of logical pages which are the source of the garbage collection are read. In the log, the physical addresses and the logical addresses of a plurality of physical pages included in the logical page are recorded. Moreover, it is determined whether the physical pages are valid or invalid (FIG. 10, step S601). The valid page determination method is the same as step S201 of FIG. 11. Moreover, the obtained valid physical pages (the addresses thereof) are classified for each channel (step S602), and are buffered into a valid page buffer (step S603). Here, the channel number is obtained from physical addresses. Moreover, when the physical pages are buffered into the valid page buffer, the physical pages are sorted so that adjacent physical pages in the combination can be multi-plane read as much as possible. When the logs are sequentially processed in logical page units, the physical page group classified for each channel naturally becomes a multi-plane readable combination. However, when the logs are processed across a plurality of logical pages, it is necessary to prevent overtaking from occurring between pages.

The read task scheduler 40 acquires a physical page (address) group from buffers of the respective channels in the valid page buffer in an in-order manner and so that the number of physical pages read from each channel is equalized as much as possible.

For example, when there are four channels, and it is necessary to read 16 physical pages in total from all channels, four valid physical pages are acquired each from the buffers of the respective channels. When the stocks are unequally distributed between channels, and the stock in some of the channels is deficient, the equalization of the number of physical pages read from each channel is abandoned, but the deficiency is compensated by reading more from the channels having surplus stocks. In this case, since the read time is unequally distributed between channels, it leads to performance deterioration.

Since the valid page buffer maintains physical page groups so that multi-plane readable physical page groups are adjacent as much as possible, according to the read operation of a channel controller described later, by taking out (First-In-First-Out) physical pages from a buffer in the order in which physical pages are stored in the buffer, it is possible to read more physical pages with a small number of multi-plane reads.

Subsequently, read task execution (step S103) on the nonvolatile memory module 201 to 20n, of the channel controllers 101 to 10n according to the present embodiment will be described. The channel controller executes two steps of processes described in the first embodiment with respect to the nonvolatile memory modules 201 to 20n when executing reading of physical pages.

The read task execution control unit 41 requests the channel controller to read 0 or more physical pages allocated by the read task scheduler 40 in an each channel-parallel manner. The zero or more physical pages are read with zero or more multi-plane reads. Here, it is assumed that the channel controller issues a multi-plane read command rather than a single-plane read command with respect to a garbage collection read request even for one physical page read request.

FIG. 28 is a diagram illustrating a distribution of valid pages of the logical pages that are the source of garbage collection. Valid pages are hatched. In FIG. 28, when a read request for physical page 5 of channel 0 is received, a multi-plane read request for a multi-plane including physical pages (1, 5, 9, 13, 17, 21, 25, and 29) rather than a single-plane read request for physical page 5 is issued with respect to a nonvolatile memory, and reading from memory cell arrays of the nonvolatile memory to page caches is executed in parallel as illustrated in FIG. 31. However, transfer from page caches in the nonvolatile memory to the channel controller is actually executed with respect to only physical pages requested from the read task execution control unit 41.

The channel controller understands data of which physical page has been read into the page cache of the nonvolatile memory. When a request to read physical pages that have been read in a page cache is received from the read task execution control unit 41, the read request from the memory cell array is not issued to the nonvolatile memory, but only the transfer request from the page cache is issued to the nonvolatile memory.

For example, in the previous state, in the stage where a read request for physical page 5 is issued, since the data of the physical pages (1, 5, 9, 13, 17, 21, 25, and 29) is read into the page cache of the nonvolatile memory, when a read request for physical page 13 or physical page 17 is subsequently received, the reading process from the memory cell array of the nonvolatile memory is not performed, but the process is completed only with the transfer time from a page register to the channel controller.

By operating the channel controller in this manner, when multi-plane readable physical pages are arranged to be adjacent to each other, and read requests for physical pages are issued to the channel controller one by one, the read times for the multi-plane read with respect to the memory cell array of the nonvolatile memory can be suppressed to a small value as compared to the case of single-plane read.

Even if the number of read physical pages is the same, the number of multi-plane read issues is different depending on a multi-plane readable combination. For example, in FIG. 28, eight physical pages are read with one multi-plane read. Thus, the multi-plane readable combinations are a combination of physical pages (11, 15, 23, and 27) and (47 and 51) for channel 2 and a combination of physical pages (4) and (40, 44, 60, and 64) for channel 3. When four physical pages are read in respective channels, although four physical pages can be read with one multi-plane read (11, 15, 23, and 27) for channel 2, whereas four physical pages are read with two multi-plane reads (4) and (40, 44, and 60) for channel 3.

In the method described in the first embodiment, in the case of the above example, since reading is executed in multi-plane units from the valid page buffer in an out-of-order manner, pages can be read with one multi-plane read of the combination of (40, 44, 60, and 64) for channel 3. Thus, it is possible to further improve equalization of inter-channel read time.

However, the method of the present embodiment can realize equalization of the inter-channel read time with a simple implementation. That is, when the number of read physical pages is large as compared to the number of multi-plane read issues, the read time is generally determined by the number of read physical pages rather than the number of multi-plane read issues. Thus, just by controlling such that the number of physical pages read for each channel becomes constant, even when there is a slight difference in the number of multi-plane reads, it is possible to obtain the effect of making the read time for each channel approximately constant.

As described above, in the present embodiment, in reading of the garbage collection process, the read time for each channel is uniformized by equalizing the number of valid pages read in each channel. Due to this, the read time for all channels can be reduced, the entire time of the garbage collection process can be reduced with a simple implementation, and the writing performance from the host can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller having a plurality of channels connectable to a plurality of nonvolatile memories, comprising:
    a valid page information management unit configured to manage identification information corresponding to at least one valid page of the nonvolatile memories, the at least one valid page being physical page of the nonvolatile memories storing valid data;
    a write buffer configured to store data to be written to the nonvolatile memories;
    a garbage collection control unit configured to execute a garbage collection process, which includes transferring the valid data of the at least one valid page into the write buffer and writing the valid data back to the nonvolatile memories; and
    a channel controller, provided in each of the channels, configured to execute a multi-plane read to the nonvolatile memories, the multi-plane read including reading valid data stored in a plurality of the at least one physical page included in multiple parallel-operable planes of the nonvolatile memories, wherein the garbage collection control unit is further configured to control the executed multi-plane read of the channel controller in each of the channels based on the identification information so that a total number of valid pages read for each channel of the plurality of channels is constant.

2. The memory controller according to claim 1, wherein the identification information is a physical address of the at least one valid page, and the garbage collection control unit is further configured to execute the multi-plane read of the valid data stored in the at least one valid page in the order in which the physical address is stored in the valid page information management unit.

3. The memory controller according to claim 1, wherein an upper-limit number of multi-plane reads for each of the channels is provided.

4. The memory controller according to claim 3, further comprising a scheduler, wherein the identification information is assigned to a group of a plurality of physical pages that is readable in parallel in the multi-plane read, the valid page information management unit includes a plurality of queues provided in each of the channels, the plurality of queues maintaining a number of items of identification information corresponding to the number of valid pages included in the group of the plurality of readable physical pages, and the scheduler determines a combination of the items of identification information, for which the multi-plane read is to be executed, based on the information maintained in the valid page information management unit.

5. The memory controller according to claim 4, wherein the scheduler is configured to determine a combination of the items of identification information based on a queueing state of the identification information in the queue among predetermined combination candidates.

6. The memory controller according to claim 5, wherein the combination candidates are determined such that the total number of valid pages has a predetermined value.

7. The memory controller according to claim 1, wherein the valid page information management unit is further configured to maintain the identification information based on logs in which the logical address of the data written to the at least one physical page is recorded in a time-series order.

8. The memory controller according to claim 2, wherein the valid page information management unit is further configured to maintain the identification information based on logs in which the logical address of the data written to the at least one physical page is recorded in a time-series order.

9. The memory controller according to claim 3, wherein the valid page information management unit is further configured to maintain the identification information based on logs in which the logical address of the data written to the at least one physical page is recorded in a time-series order.

10. The memory controller according to claim 4, wherein the valid page information management unit is further configured to maintain the identification information based on logs in which the logical address of the data written to the at least one physical page is recorded in a time-series order.

11. A memory system comprising:

a plurality of nonvolatile memories provided in each of a plurality of channels;

a valid page information management unit configured to manage identification information corresponding to at least one valid page of the nonvolatile memories, the at least one valid page being at least one physical page of the nonvolatile memories storing valid data;

a write buffer configured to store data to be written to the nonvolatile memories;

a garbage collection control unit configured to execute a garbage collection process, which includes transferring the valid data of the at least one valid page into the write buffer and writing the valid data back to the nonvolatile memories; and a channel controller, provided in each of the channels, configured to execute multi-plane read to the nonvolatile memories, the multi-plane read including reading valid data stored in a plurality of the at least one physical page included in multiple parallel-operable planes of the nonvolatile memories, wherein the garbage collection control unit is further configured to control the executed multi-plane read of the channel controller in each of the channels based on the identification information so that a total number of valid pages read for each channel of the plurality of channels is constant.

12. The memory system according to claim 11, wherein the identification information is a physical address of the at least one valid page, and the garbage collection control unit is further configured to execute the multi-plane read of the valid data stored in the at least one valid page in the order in which the physical address is stored in the valid page information management unit.

13. The memory system according to claim 11, wherein an upper-limit number of multi-plane reads for each of the channels is provided.

14. The memory system according to claim 13, further comprising a scheduler, wherein the identification information is assigned to a group of a plurality of physical pages that is readable in parallel in the multi-plane read, the valid page information management unit includes a plurality of queues provided in each of the channels, the plurality of queues maintaining a number of items of identification information corresponding to the number of valid pages included in the group of the plurality of readable physical pages, and the scheduler determines a combination of the items of identification information, for which the multi-plane read is to be executed, based on the information maintained in the valid page information management unit.

15. The memory system according to claim 14, wherein the scheduler is configured to determine a combination of the items of identification information based on a queueing state of the identification information in the queue among predetermined combination candidates.

16. The memory system according to claim 15, wherein the combination candidates are determined such that the total number of valid pages has a predetermined value.

17. The memory system according to claim 11, wherein the valid page information management unit is further configured to maintain the identification information based on logs in which the logical address of the data written to the at least one physical page is recorded in a time-series order.

18. The memory system according to claim 12, wherein the valid page information management unit is further configured to maintain the identification information based on logs in which the logical address of the data written to the at least one physical page is recorded in a time-series order.

19. The memory system according to claim 13, wherein the valid page information management unit is further configured to maintain the identification information based on logs in which the logical address of the data written to the at least one physical page is recorded in a time-series order.

20. The memory system according to claim 14, wherein the valid page information management unit is further configured to maintain the identification information based on logs in which the logical address of the data written to the at least one physical page is recorded in a time-series order.

* * * * *